(12) United States Patent
Stanimirovic et al.

(10) Patent No.: US 11,996,720 B2
(45) Date of Patent: May 28, 2024

(54) ELECTRONIC CIGARETTE CHARGING AND MANAGEMENT SYSTEM

(71) Applicants: Steven Stanimirovic, Bal Harbour, FL (US); David Abadi, Bal Harbour, FL (US); Jonathan Romero, Miami, FL (US)

(72) Inventors: Steven Stanimirovic, Bal Harbour, FL (US); David Abadi, Bal Harbour, FL (US); Jonathan Romero, Miami, FL (US)

( * ) Notice: Subject to any disclaimer, the term of this patent is extended or adjusted under 35 U.S.C. 154(b) by 620 days.

(21) Appl. No.: 17/236,092

(22) Filed: Apr. 21, 2021

(65) Prior Publication Data
US 2021/0242697 A1 Aug. 5, 2021

Related U.S. Application Data

(63) Continuation-in-part of application No. 17/108,749, filed on Dec. 1, 2020, now Pat. No. 11,502,524, which is a continuation-in-part of application No. 16/810,816, filed on Mar. 5, 2020, now Pat. No. 10,855,092, which is a continuation-in-part of application No. 16/553,117, filed on Aug. 27, 2019,
(Continued)

(51) Int. Cl.
*H04W 88/02* (2009.01)
*H02J 7/00* (2006.01)
*H02J 7/34* (2006.01)
*H04M 1/72409* (2021.01)
*H02J 50/10* (2016.01)
*H04B 1/3827* (2015.01)

(52) U.S. Cl.
CPC ............ *H02J 7/0044* (2013.01); *H02J 7/342* (2020.01); *H04M 1/724092* (2022.02); *H02J 7/00034* (2020.01); *H02J 7/0013* (2013.01); *H02J 50/10* (2016.02); *H04B 1/3833* (2013.01); *H04W 88/02* (2013.01)

(58) Field of Classification Search
CPC ........ H02J 7/0044; H02J 7/342; H02J 7/0013; H02J 50/10; H02J 7/00034; H04B 1/3833; H04B 1/3888; H04W 88/02; H04M 1/72409; H04M 1/21; H04M 1/185
See application file for complete search history.

(56) References Cited

U.S. PATENT DOCUMENTS

| | | | |
|---|---|---|---|
| 2011/0265806 A1* | 11/2011 | Alarcon ................ | A24F 40/485 131/273 |
| 2015/0201050 A1* | 7/2015 | Yang .................... | H04B 1/3888 455/575.8 |
| 2016/0345628 A1* | 12/2016 | Sabet ..................... | H04M 1/21 |

* cited by examiner

*Primary Examiner* — Ronald Eisner
(74) *Attorney, Agent, or Firm* — Mark Terry

(57) ABSTRACT

An electronic cigarette charging and management system includes a housing for coupling to a rear of a mobile computing device, the housing including a battery, a first power port for accepting external power for recharging the battery, a first receptacle for accepting an electronic cigarette element, a charging terminal for recharging a battery of the electronic cigarette element and a processor for collecting data from the electronic cigarette element including battery level, electronic cigarette liquid level, tobacco, flower or bud level and current electronic cigarette element usage. The system also includes a mobile application on the mobile computing device for communicably coupling the mobile computing device to the charging device, reading the data from the charging device, and displaying said data on the mobile computing device.

20 Claims, 25 Drawing Sheets

Related U.S. Application Data now Pat. No. 10,686,320, which is a continuation of application No. 15/913,710, filed on Mar. 6, 2018, now Pat. No. 10,396,575, which is a continuation-in-part of application No. 15/640,179, filed on Jun. 30, 2017, now Pat. No. 10,003,372, which is a continuation-in-part of application No. 15/465,559, filed on Mar. 21, 2017, now abandoned, which is a continuation-in-part of application No. 14/948,951, filed on Nov. 23, 2015, now Pat. No. 9,602,646, which is a continuation-in-part of application No. 14/604,303, filed on Jan. 23, 2015, now Pat. No. 9,197,726.

(60) Provisional application No. 61/933,091, filed on Jan. 29, 2014.

ELECTRONIC CIGARETTE CHARGING AND MANAGEMENT SYSTEM

CROSS-REFERENCE TO RELATED APPLICATIONS

This patent application is a continuation in part of patent application Ser. No. 17/108,749 filed Dec. 1, 2020 and entitled "Combination Electronic Cigarette Holder and Charger", which is a continuation in part of patent application Ser. No. 16/810,816 filed Mar. 5, 2020 and entitled "Combination Electronic Cigarette Holder and Charger", now U.S. Pat. No. 10,855,092, which is a continuation in part of patent application Ser. No. 16/553,117 filed Aug. 27, 2019 and entitled "Combination Mobile Phone Case and Electronic Cigarette", now U.S. Pat. No. 10,686,320, which is a continuation of patent application Ser. No. 15/913,710 filed Mar. 6, 2018 and entitled "Combination Mobile Phone Case and Electronic Cigarette", now U.S. Pat. No. 10,396,575, which is a continuation in part of patent application Ser. No. 15/640,179 filed Jun. 30, 2017 and entitled "Combination Mobile Phone Case and Electronic Cigarette", now U.S. Pat. No. 10,003,372, which is a continuation in part of patent application Ser. No. 15/465,559 filed Mar. 21, 2017 and entitled "Combination Mobile Phone Case and Electronic Cigarette", which is a continuation in part of patent application Ser. No. 14/948,951 filed Nov. 23, 2015 and entitled "Combination Mobile Phone Case and Electronic Cigarette", now U.S. Pat. No. 9,602,646, which is a continuation in part of patent application Ser. No. 14/604,303 filed Jan. 23, 2015 and entitled "Combination Mobile Phone Case and Electronic Cigarette", now U.S. Pat. No. 9,197,726, which claims priority to provisional patent application No. 61/933,091 filed Jan. 29, 2014 and entitled "E-Cigarette in a Cell Phone Case". Application Ser. Nos. 16/810,816, 16/553,117, 15/913,710, 15/640,179, 15/465,559, 14/948,951, 61/933,091 and 14/604,303 are hereby incorporated by reference in their entirety.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

TECHNICAL FIELD

The claimed embodiments relate to the fields of mobile computing devices and electronic cigarettes, and more specifically to accessories for merging mobile computing devices with electronic cigarettes.

BACKGROUND

Millions of people worldwide own mobile computing devices and mobile telephones for communication. As a result, a wide variety of accessories for mobile computing devices and mobile phones have become popular, including mobile phone cases, computing device cases, charging cases, charging packs, attachable pockets, attachable wallets, etc. Additionally, in recent years, many people have begun to smoke electronic cigarettes as a safer alternative to smoking tobacco cigarettes. Most electronic cigarettes include a battery-powered heating element that atomizes a liquid solution, oil, tobacco, flower or bud into a vapor that a user can inhale into his lungs. Typically, a liquid solution can include a mixture of propylene glycol, glycerin, nicotine, flavorings, preservatives, oil, other fillers, and any combination thereof. Flower or bud can include the bloom or blossom of a plant or any part of a plant that produces seeds or that is consumable. Because of the decreased health dangers associated with smoking electronic cigarettes, this relatively new product has become very popular.

Many consumers who use mobile computing devices and mobile phones also use electronic cigarettes. One of the problems such people encounter is a lack of storage space necessary to hold both a mobile computing device or mobile phone and an electronic cigarette at the same time. For example, a person may not have enough room in their pockets to store both a mobile computing device or mobile phone and an electronic cigarette at the same time. Also, both a device/phone and an electronic cigarette require separate electrical cords, which can be cumbersome and cause clutter. Additionally, people with a tendency for losing items, may lose an electronic cigarette if it is not secured to another item. Furthermore, if a person uses a mobile computing device or mobile phone and also smokes electronic cigarettes, that person currently has to purchase the device/phone and electronic cigarettes at different points in time. This can be time consuming and tedious.

As a result, there exists a need for improvements over the prior art and more particularly for a more efficient way to use both electronic cigarettes and mobile computing devices or mobile phones.

SUMMARY

An electronic cigarette charging and management system is disclosed. This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

In one embodiment, an electronic cigarette charging and management system is disclosed. The system comprises a charging device including a housing configured for coupling to a rear of a mobile computing device, the housing including a rechargeable battery, a first power port in the housing, the first power port conductively coupled to the rechargeable battery and configured for accepting external power for recharging the rechargeable battery, a first receptacle in the housing, wherein the first receptacle is configured to accept an electronic cigarette element, a charging terminal located in the first receptacle such that when the electronic cigarette element is inserted into the first receptacle, one end of the electronic cigarette element contacts the charging terminal, and wherein the charging terminal is conductively coupled to the rechargeable battery, wherein when the electronic cigarette element contacts the charging terminal, the rechargeable battery recharges a battery of the electronic cigarette element and a processor configured for communicably coupling to the electronic cigarette element and collecting data from the electronic cigarette element including battery level, electronic cigarette liquid level, oil level, tobacco level, flower or bud level and current electronic cigarette element usage. The system further includes a mobile application executing on the mobile computing device, the mobile application configured for communicably coupling the mobile computing device to the charging device, reading the data from the charging device, and displaying said data on the mobile computing device.

Additional aspects of the disclosed embodiment will be set forth in part in the description which follows, and in part will be obvious from the description, or may be learned by practice of the disclosed embodiments. The aspects of the disclosed embodiments will be realized and attained by means of the elements and combinations particularly pointed out in the appended claims. It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute part of this specification, illustrate embodiments of the claimed subject matter and together with the description, serve to explain the principles of the disclosed embodiments. The embodiments illustrated herein are presently preferred, it being understood, however, that the claimed subject matter is not limited to the precise arrangements and instrumentalities shown, wherein:

DETAILED DESCRIPTION

Figure 1:
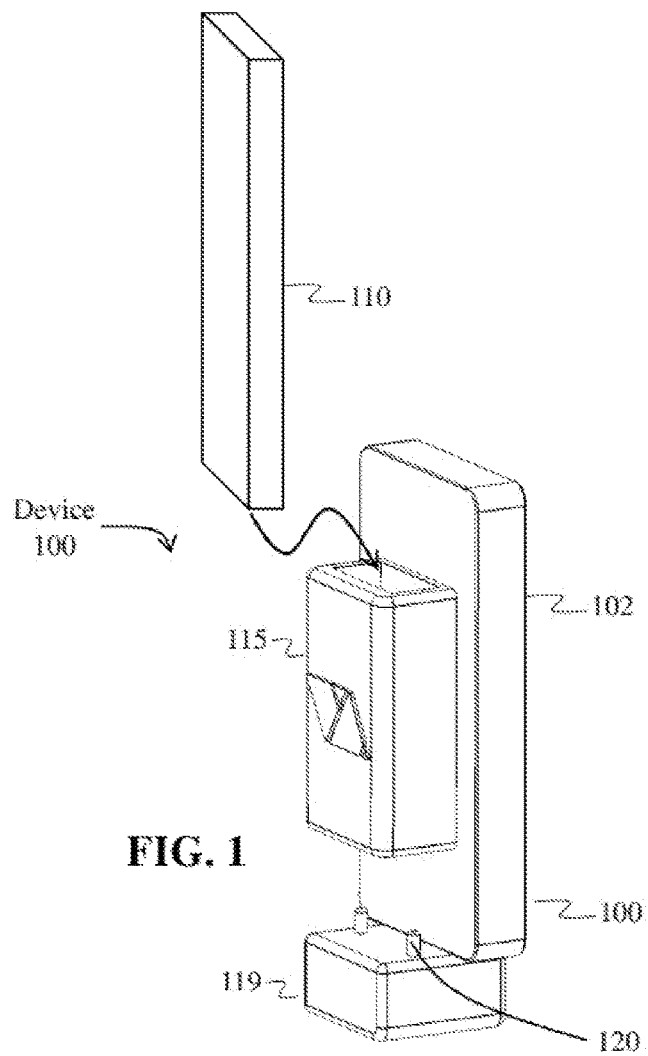
FIG. 1 is a perspective view of a device for holding and charging an electronic cigarette element, showing the electronic cigarette element currently removed, according to one embodiment.

The following detailed description refers to the accompanying drawings. Whenever possible, the same reference numbers are used in the drawings and the following description to refer to the same or similar elements. While disclosed embodiments may be described, modifications, adaptations, and other implementations are possible. For example, substitutions, additions, or modifications may be made to the elements illustrated in the drawings, and the methods described herein may be modified by substituting reordering or adding additional stages or components to the disclosed methods and devices. Accordingly, the following detailed description does not limit the disclosed embodiments. Instead, the proper scope of the disclosed embodiments is defined by the appended claims.

The disclosed embodiments improve upon the problems with the prior art by providing a device for holding and charging an electronic cigarette element and/or a mobile computing device, such as a mobile phone. The disclosed embodiments allow for a single, integrated product that satisfies both the charging requirements of a rechargeable mobile computing device and a rechargeable electronic cigarette in one unit, requiring only one electrical cord, and optionally sharing one rechargeable battery. The disclosed embodiments improve over the prior art by decreasing the amount of storage space required to store both an electronic cigarette and a mobile computing device, while also decreasing the number of electrical cords necessary for two separate electrical products. Additionally, the disclosed embodiments improve over the prior art by decreasing the amount of purchases that a user must complete in order to purchase a recharging solution for both a mobile computing device and an electronic cigarette. Furthermore, the disclosed embodiments improve over the prior art by decreasing the likelihood that a person with a tendency to lose things will lose or misplace an electronic cigarette and/or a mobile computing device, as well as a charger for both items.

The disclosed embodiments further improve over the prior art by providing a system that allows a user to manage his electronic cigarette usage. The claimed embodiments include a mobile application for providing a text field for a user to enter a goal for electronic cigarette element usage, calculating a comparison of the user's goal for electronic cigarette element usage to the current electronic cigarette element usage and displaying said comparison on the mobile computing device. Also, the mobile application calculates a recommendation for meeting the user's goal for electronic cigarette element usage based on the current electronic cigarette element usage and displaying said recommendation on the mobile computing device. Said recommendations may include advice on how many puffs the user may take in a given hour, day, week or month to stay at or below the user's goal for electronic cigarette element usage. Therefore, said module is configured to allow a user to manage his usage of the electronic cigarette element, and his vaporizing activity in general.

FIG. 1 is a perspective view of the device 100 for holding and charging an electronic cigarette element 110, according to one embodiment. The device 100 comprises a housing 102 having a planar surface (on the rear) deposited with adhesive configured for coupling to a rear of a mobile computing device, the housing including a rechargeable battery. In this document, the term mobile computing device refers to a mobile phone, pager, laptop, tablet computer, personal digital assistant, handheld computer, netbook, mobile computer, handheld video game system, etc. The device 100 includes a first power port in the housing 102, the first power port conductively coupled to the rechargeable battery and configured for accepting external power for recharging the rechargeable battery. The device 100 includes a tubular element 115 coupled to the housing 102, the tubular element having a cavity that is configured to accept an electronic cigarette element 110. The device 100 includes a charging terminal 120 located on the housing 102 such that when the electronic cigarette element 110 is inserted in to the tubular element 115, one end of the electronic cigarette element 110 contacts the charging terminal, and wherein the charging terminal 120 is conductively coupled to the rechargeable battery.

FIG. 1 also shows that the housing 102 also includes a removable portion or block 119, located at the bottom of the device 100. Note that the charging terminal 120 is coupled to a top surface of the removable block 119. Also note that different types of electronic cigarette elements can have different types of charging terminal connections. The removable block 119 is a portion of the housing 102 that may be removed, so as to accommodate different types of charging terminal for different types of electronic cigarette elements. As users of the device 100 purchase different types of electronic cigarette elements, those users can purchase different types of removable blocks that accommodate the charging terminal connections of the electronic cigarette elements.

Figure 2:
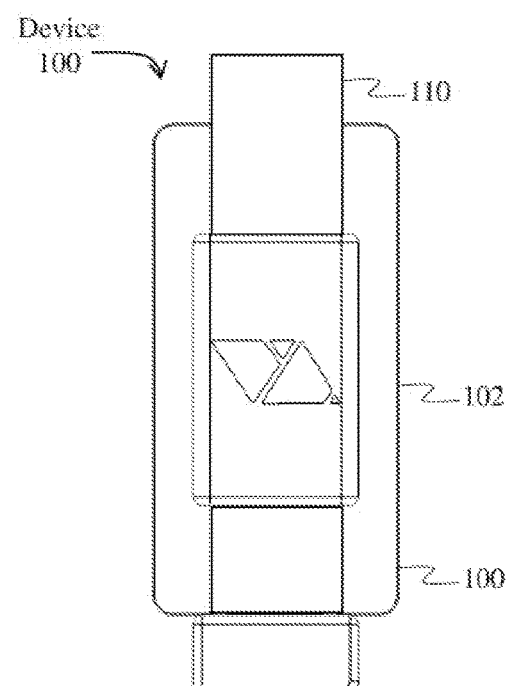
FIG. 2 is a front view of the device for holding and charging an electronic cigarette element, showing the electronic cigarette element currently inserted, according to one embodiment.

FIG. 2 is a front view of the device 100 for holding and charging an electronic cigarette element 110, according to one embodiment. FIG. 2 shows that when the electronic cigarette element 110 is inserted into the tubular element 115, one end of the electronic cigarette element 110 contacts the charging terminal, and when the electronic cigarette element contacts the charging terminal 120, the rechargeable battery recharges a battery of the electronic cigarette element 110.

An electronic cigarette element 110 (more fully described below) is retained within the tubular element 115. The electronic cigarette element can comprise components and functions similar to electronic cigarettes that are well known to those skilled in the art. The electronic cigarette element includes a heating element (not shown) conductively coupled to a rechargeable battery in the cigarette element. The heating element within the electronic cigarette is adapted for heating a liquid (or a solid such as tobacco, flower or bud) into vapor. Heating elements are well known to those skilled in the art and may be a coiled, wire, ribbon or straight heating element, comprising materials such as nichrome, nickel, chromium, resistance wire, etched foil, ceramic, composites, metal or any combination thereof. The electronic cigarette element also includes an extended hollow conduit, tubular element, or mouthpiece at one end of the electronic cigarette element and is shaped and sized for allowing a user to inhale vapor through the tubular element. The housing includes a tubular element 115 such that the electronic cigarette 110 can extend through the body of the tubular element 115. The tubular element 115 opening is sized such that it closely fits around the electronic cigarette 110.

In another embodiment, the electronic cigarette element is coupled to the housing 102 via a magnetic element. A magnetic element may comprise two components: 1) a magnet and 2) a ferrous metal component that is attracted to the magnet. In one embodiment, the housing includes a magnet, and the electronic cigarette element may include a ferrous metal component that is attracted to the magnet, such that the electronic cigarette element is mounted or coupled to the housing. In another embodiment, the location of the magnet and the ferrous metal component is reversed. In yet another embodiment, two magnets are used instead.

The various components of the device 100 may be comprised of materials such as plastics, rubberized plastic, silicone, water resistant material, resilient material, silicone, rubber, leather, etc. The various components of the device 100 can be separate and be may be affixed with glue, acrylic glue, fasteners, snaps etc. or the components may be integral with one another.

Figure 3A:
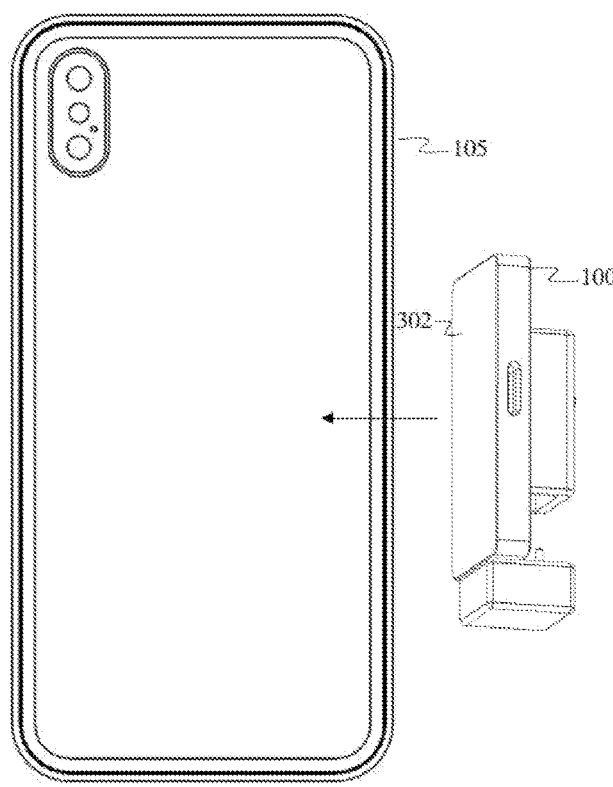
FIG. 3A is a perspective view of the device for holding and charging an electronic cigarette element, showing the device currently removed from a mobile phone, according to one embodiment.
Figure 3B:
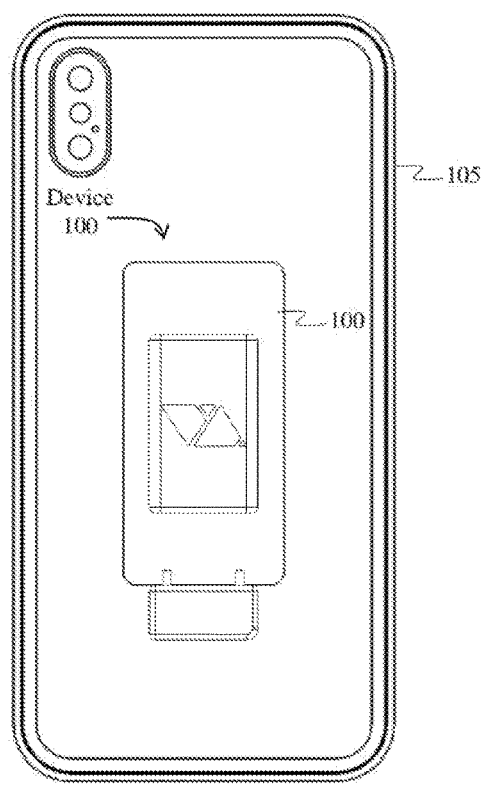
FIG. 3B is a front view of the device for holding and charging an electronic cigarette element, showing the device currently attached to a mobile phone, according to one embodiment.

FIG. 3A is a perspective view of the device 100 adjacent to a mobile phone 105, according to one embodiment. FIG. 3A shows that the device 100 comprises a housing 102 having a planar surface 302 (on the rear) deposited with adhesive configured for coupling to a flat surface, such as the rear of the mobile phone 105. In one alternative to the adhesive, a magnetic element, described more fully herein, may be used to couple the device 100 to the mobile phone 105. FIG. 3B is a rear view of the device 100 and mobile phone 105, according to one embodiment. FIG. 3B shows that the device 100 has been coupled to a rear of the mobile phone 105. Note that although FIGS. 3A and 3B show the device 100 coupled to a mobile phone, the claimed subject matter supports the device 100 coupled to any flat surface, including the flat surface of any mobile computing device, any apparatus or any piece of furniture.

Figures 4A, 4B:
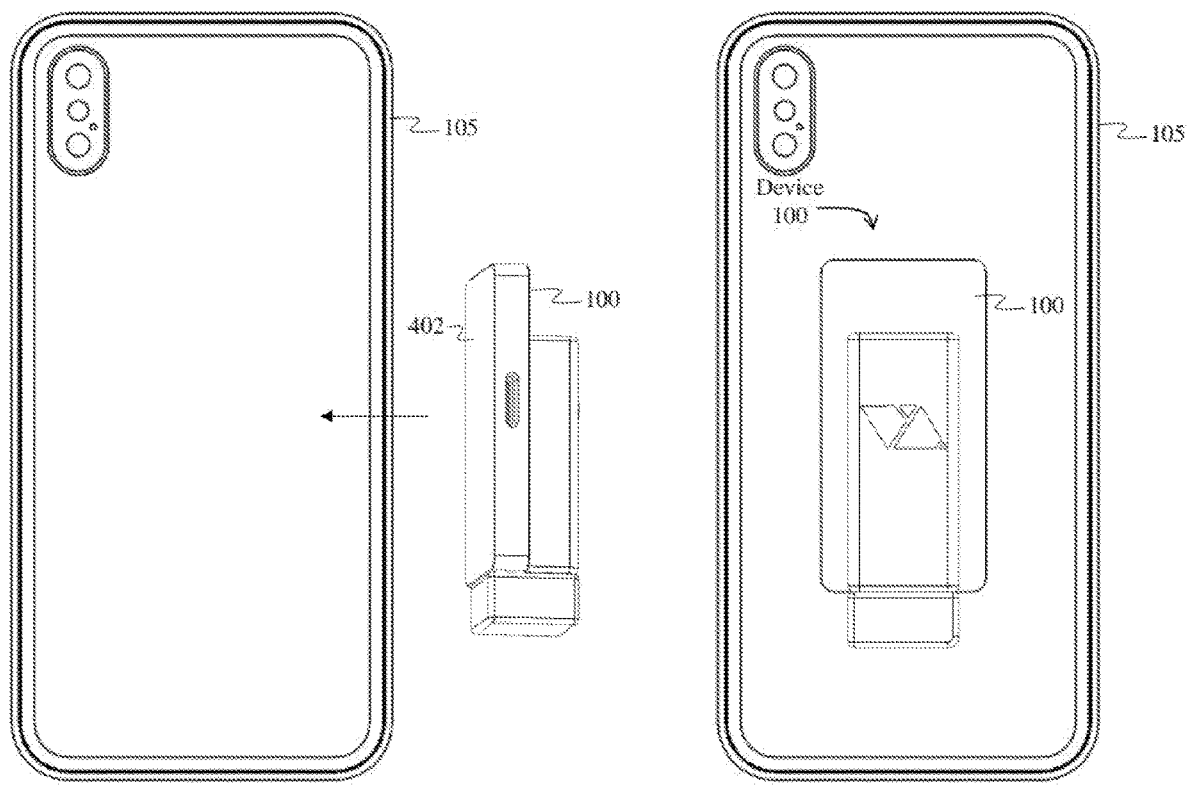
FIG. 4A is a perspective view of the device for holding and charging an electronic cigarette element, showing the device currently removed from a mobile phone, according to an alternative embodiment.
FIG. 4B is a front view of the device for holding and charging an electronic cigarette element, showing the device currently attached to a mobile phone, according to an alternative embodiment.

FIG. 4A is a perspective view of another embodiment or arrangement of the device 100 adjacent to a mobile phone 105, according to one embodiment. FIG. 3B shows that the device 100 comprises a housing 102 having a planar surface 402 (on the rear) deposited with adhesive configured for coupling to a flat surface, such as the rear of the mobile phone 105. In one alternative to the adhesive, a magnetic element, described more fully herein, may be used to couple the device 100 to the mobile phone 105. FIG. 4B is a rear view of another embodiment or arrangement of the device 100 and mobile phone 105, according to one embodiment. FIG. 4B shows that the device 100 has been coupled to a rear of the mobile phone 105. Note that although FIGS. 4A and 4B show the device 100 coupled to a mobile phone, the claimed subject matter supports the device 100 coupled to any flat surface, including the flat surface of any mobile computing device, any apparatus or any piece of furniture. In one embodiment, the version of the device 100 shown in FIGS. 4A and 4B includes the charging terminal 120 attached to a non-removable element, similar to block 119.

Figure 5A:
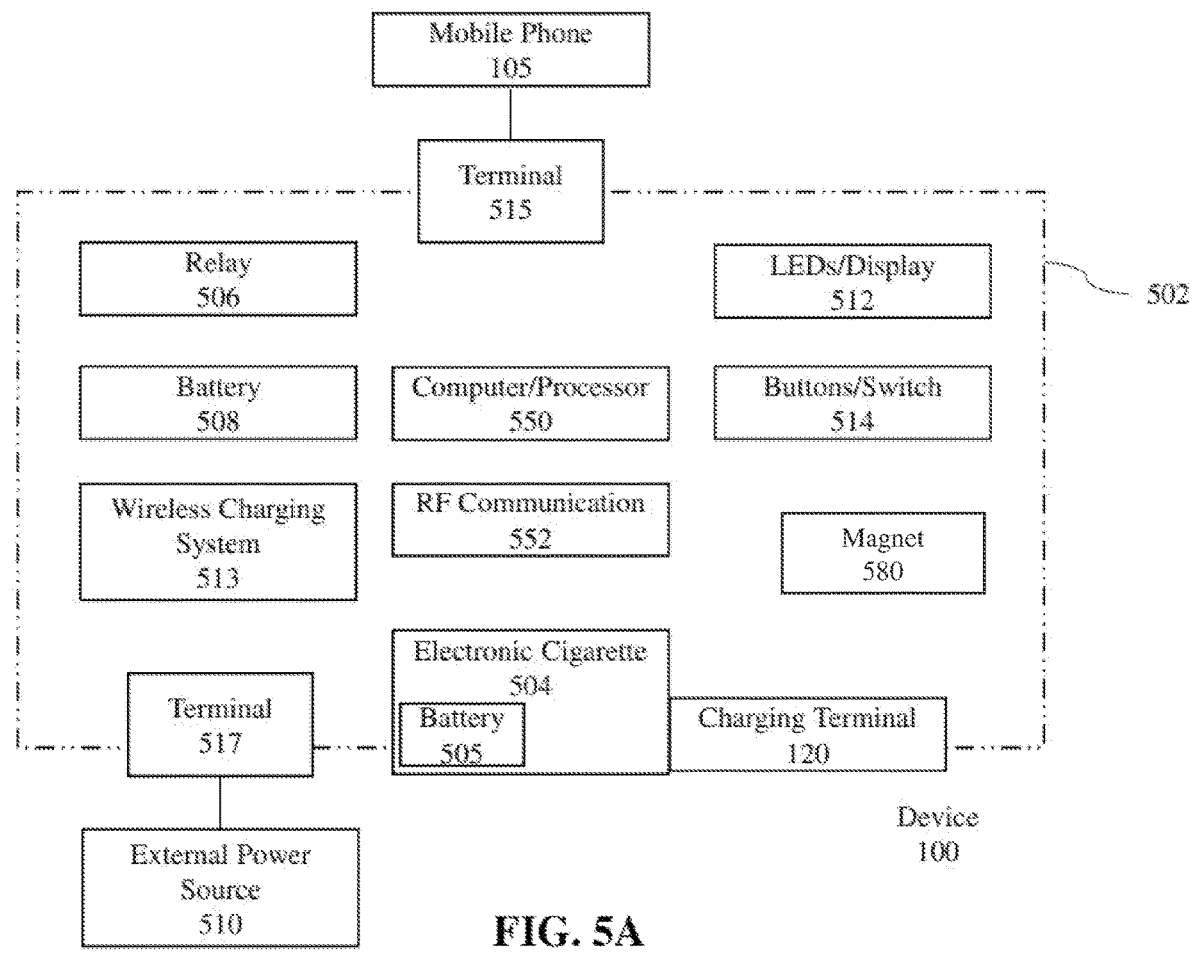
FIG. 5A is a block diagram illustrating components of the device for holding and charging an electronic cigarette element, according to an example embodiment.

FIG. 5A is a block diagram illustrating components of the device 100 for holding and charging an electronic cigarette element, according to an example embodiment. The components within hashed line 502 are the components included in the device 100. The components within the device 100 can be conductively coupled with conductors, such as solder, wire, etc. The components within hashed line 502 are a non-limiting embodiment and other components may also be included and different arrangements of the components are contemplated and are consistent with the spirit of the claimed subject matter.

External power source 510 is conductively coupled, and provides power, to an external terminal 517 (or power port), which is conductively coupled to other components of the device 100, such as rechargeable battery 508. The terminal 517 is the point at which a conductor from device 100 comes to an end and provides a point of connection to external circuits. A terminal may simply be the end of a wire or it may be fitted with a connector or fastener. The terminal may be a male jack, male connector, a female jack, a female connector, a USB connector. The terminal may be any plug or connector that is used to transfer data and/or electrical current. The terminal may also be a magnetic terminal, which may be a magnetically attached power or data connector. The magnetic terminal is held in place magnetically so that if it is tugged, it will pull out of the connection without damaging the components, the device, or the phone. Magnets may be placed within the connector and arranged in opposing polarities for improved coupling strength. The terminal may also be referred to as a power port, plug, jack, or connector.

The external power source can be a DC or AC power source or power supply, such as a rechargeable solar powered battery, battery, line voltage, etc. The rechargeable battery 508 can be a single battery or a plurality of conductively coupled batteries, wherein each battery can comprise a variety of configurations or arrangements, such lead-acid, nickel cadmium (NiCd), nickel metal hydride (NiMH), lithium ion (Li-ion), and lithium ion polymer (Li-ion) polymer or any combination thereof. The rechargeable battery 508 may be removable in the same manner in which rechargeable batteries are removable from appliances, as is well known win the art.

External terminal 515 (or power port) is conductively coupled to other components of the device 100, such as rechargeable battery 508. Terminal 515 is configured for accepting a cable for connecting the terminal 515 to a power port of the mobile computing device or mobile phone 105, and the terminal 515 is further configured for routing power from the rechargeable battery 508 to a battery of the mobile computing device, or for routing power from the battery of the mobile computing device to the rechargeable battery 508.

In one embodiment, the device 100 supports wireless charging, otherwise known as inductive charging. In this embodiment, the external power source 510 wirelessly provides power to the battery 508 using wireless charging. In this embodiment, the device 100 would include a wireless charging system 513 (well known in the art) that includes an induction coil that interacts with an induction coil associated with the external power source, so as to execute inductive charging. Wireless charging system 513 may also be used to wirelessly charge the battery of the mobile computing device, such as mobile phone 105, or to wirelessly charge the battery 505 of the element 504.

FIG. 5A also shows electronic cigarette 504, which may comprise all components referred to previously as an electronic cigarette element. As explained above, in one alternative, electronic cigarette 504 may include its own removable rechargeable battery 505 apart from battery 508. In this alternative, the battery 505 is used to power the heating element of the cigarette element 504, especially when the cigarette element has been removed from the device 100.

The device 100 also includes a battery 508 conductively coupled to a relay 506, such a solid-state switch. The relay is used to electromechanically control the flow of power from the battery 508 to the mobile phone 105 and electronic cigarette 504. The heating element of the electronic cigarette may be conductively coupled to the battery 508 (via relay 506) such that when the system allows power from the battery 508 to be received by the heating element, the heating element heats the liquid (or solid) within the electronic cigarette and turns the liquid (or solid) into a vapor. Also, the battery 505 of the electronic cigarette may be conductively coupled to the battery 508 (via relay 506) such that the system allows power from the battery 508 to be received by the battery 505 so as to recharge battery 505.

Likewise, the mobile phone 105 is conductively coupled to the battery 508 (via relay 506) such that when the system allows power from the battery 508 to be received by the mobile phone 105, the mobile phone 105 is powered by the battery 508 or the battery within the mobile phone 105 is recharged by the battery 508. (Note that in one embodiment, the phone 105 is not conductively coupled to the device 100 via a wire.) In one embodiment, the processor 550 collects data from the electronic cigarette 504, such as the state or charge level of the battery 505 within cigarette 504, and also from the phone 105, such as the state or charge level of the battery within phone 105. In this embodiment, based on the data received from cigarette 504 and the phone 105, the processor 505 determines to which unit power will be routed from the battery 508. If the battery within phone 105 is depleted or more depleted than the battery 505 of cigarette 504, then the processor 550 commands relay 506 to route power from battery 508 to the battery of the mobile phone 105. If the battery within cigarette 504 is depleted or more depleted than the battery of phone 105, then the processor 550 commands relay 506 to route power from battery 508 to the battery within cigarette 504. In another embodiment, the processor 550 commands relay 506 to route partial power from battery 508 to the battery 505 within cigarette 504 and partial power from battery 508 to the battery within phone 105. In yet another embodiment, the processor 550 commands relay 506 to route power from the battery of phone 105 to the battery 508, and/or the battery 505 within cigarette 504. In yet another embodiment, the processor 550 commands relay 506 to route power from the battery of phone 105 and/or the battery 508, directly to the heating element within cigarette 504, bypassing the battery 505.

Note that in one embodiment, the phone 105 is not conductively coupled to the device 100 via a wire. In a related embodiment, the phone 105 supports wireless charging of its battery (which would require an induction coil in the phone 105). Likewise, in a previously discussed embodiment, the device 100 supports wireless charging of its battery 508 by an external power source 510. In yet another embodiment, the claimed subject matter supports wireless charging of the battery 505 by the battery 508 using inductive coupling. In this embodiment, the electronic cigarette 504 would include an induction coil that interacts with an induction coil associated with the device 100, so as to execute inductive charging. In a further embodiment, the claimed subject matter supports wireless charging of the battery of phone 105 by the battery 508 using inductive coupling.

A communications bus may connect the components within the housing and provides communication of data among the components of the circuit. The bus also provides communication between the device 100 and the mobile phone 105, as well as the cigarette 504. Also included in the circuit within device 100 is LEDs/display 512. LEDs lights can be located on the body of the housing for indicating the amount of power remaining in the battery and/or electronic cigarette. The LEDs can be different colors and sizes and various combinations of colors can indicate varying levels of charge remaining in the battery. A graphical user interface (or simply user interface) or display may also be used for indicating the level of power as well as other parameters and settings associated with the electronic cigarette. For example, said user interface may be used to prompt the processor 550 (in response to user input) to route power between the battery of the mobile phone 105, the battery 508, the battery 505 of the electronic cigarette element and the heating element of the electronic cigarette element, as defined more fully below. Buttons or switches 514 can be a push button, switch or any small knob or disk that when pressed activates an electric circuit and is connected to the bus and can be used to open or close the electrical circuit when the button, switch or knob is depressed. The button, switch or knob can be used for powering on and off the device 100 as well as for adjusting the settings and parameters of the device 100 and electronic cigarette 504, as well as power routing functions, as defined more fully herein. The button, switch or knob can be used to activate and deactivate the processor 550 from routing power to and from the batteries 505, 508 and the battery of the mobile 105 between each other, as described above.

Processor 550 is used to control, through the communications bus, functions including the opening and closing of the relay switch to route the power from the rechargeable battery to the mobile phone power port and to the battery 505 or heating element of the electronic cigarette element and to control the LEDs and/or graphical user interface display. Processor 550 could be any type of processor such as a microcontroller, a programmable logic controller or an ASIC (Application Specific Integrated Circuit).

Alternative to the use of the buttons, switches or knobs described above (see item 514), the user may control functions of the device 100, such as power routing functions, using a mobile application executing on a mobile computing device (such as devices 105, 700 or 1516). The device 100 may include a radio frequency communication chip 552 that is able to communicate via radio frequency with a mobile computing device. A Bluetooth chip is one example of a radio frequency communication chip 552. The user may control power routing functions of the device 100 by interacting with widgets on a touch display screen (such as sliders, pull down menus, buttons, and text fields) of a mobile application executing on a mobile computing device. This alternative reduces or eliminates the necessity for buttons or switches 514 on the device 100. In addition to power routing functions, the mobile application may also provide status data, such as the amount of battery power left on the device 100 or the electronic cigarette element 504, how long it would take to recharge both the battery of the device 100 or the electronic cigarette element 504, how many puffs or drags were taken from the electronic cigarette element 504, and when the e-liquid pod of the cigarette 504 is almost empty. The mobile application may also be linked to a website to reorder e-liquid pods for the cigarette 504. The mobile application may also allow the user to control the temperature of the electronic cigarette element 504.

In one embodiment, processor 550 is configured for communicably coupling to the electronic cigarette element 504 and collecting data from the electronic cigarette element including battery level (of battery 505), electronic cigarette liquid level, oil level, tobacco level, flower or bud level and current electronic cigarette element usage. Current electronic cigarette element usage may comprise a number of puffs of the electronic cigarette element from a set date to the present. A puff is defined as one discrete sucking gesture wherein the user purses his lips around the working end of the tubular element 523 and sucks the vapor produced by the electronic cigarette element into his lungs. Current electronic cigarette element usage may comprise an amount of electronic cigarette liquid, oil, tobacco or flower/bud consumed from a set date to the present. Each puff of the electronic cigarette element may consume a certain amount of electronic cigarette liquid, oil, tobacco or flower/bud, and therefore an amount of electronic cigarette liquid, oil, tobacco or flower/bud consumed from a set date to the present may be calculated based on the number of puffs of the electronic cigarette element from a set date to the present.

In another embodiment, the mobile application includes a module (such as module 607) configured for communicably coupling the mobile computing device (such as 105, 700 or 1516) to the charging device 100, reading the data from the charging device 100 (including battery level, electronic cigarette liquid level, oil level, tobacco level, flower/bud level and current electronic cigarette element usage), and displaying said data on the mobile computing device, such as on display 614.

Figure 26:
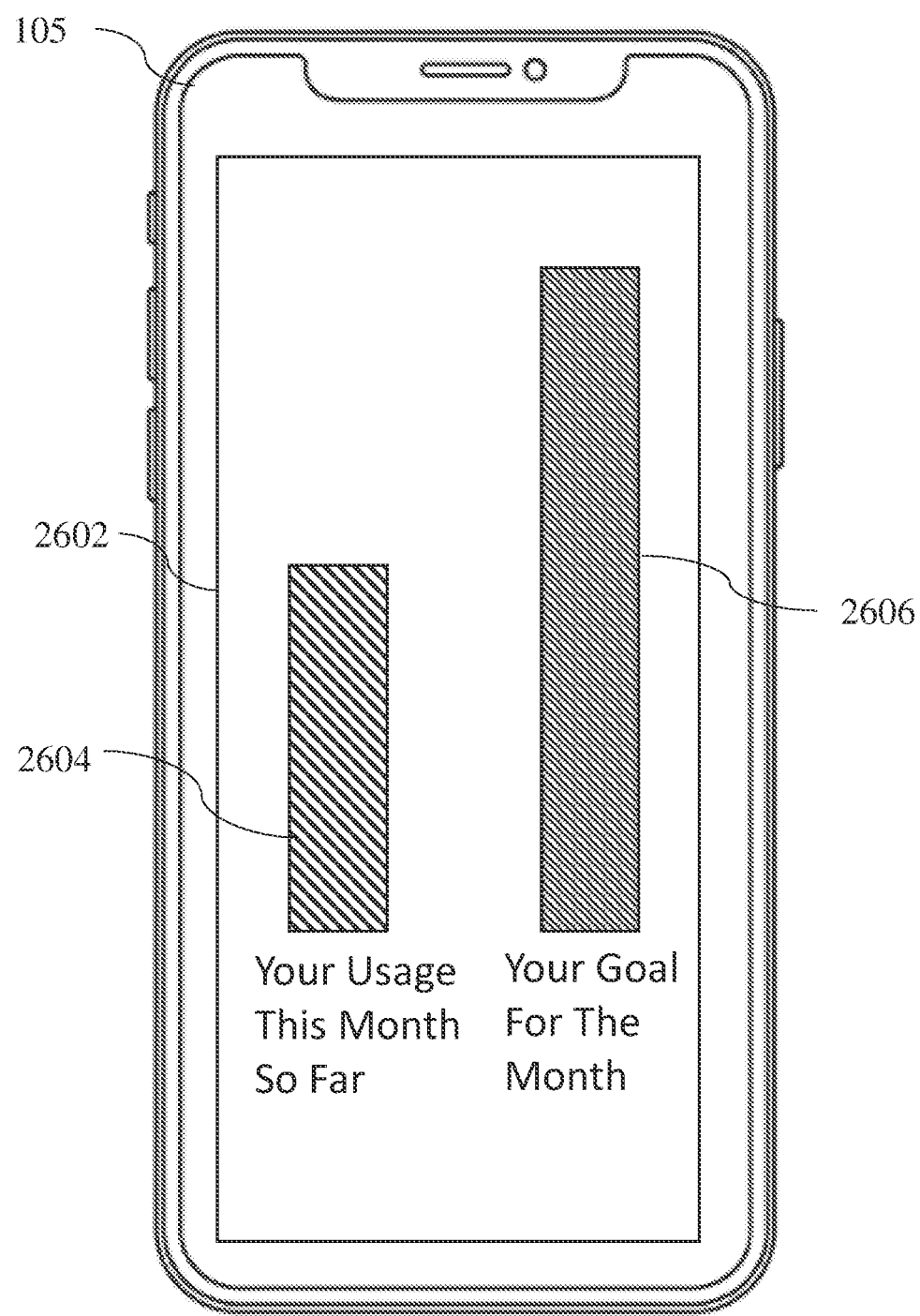
FIG. 26 is a drawing depicting a graphical user interface of the mobile application on the mobile computing device, wherein the graphical user interface is used to manage electronic cigarette usage.
Figure 27:
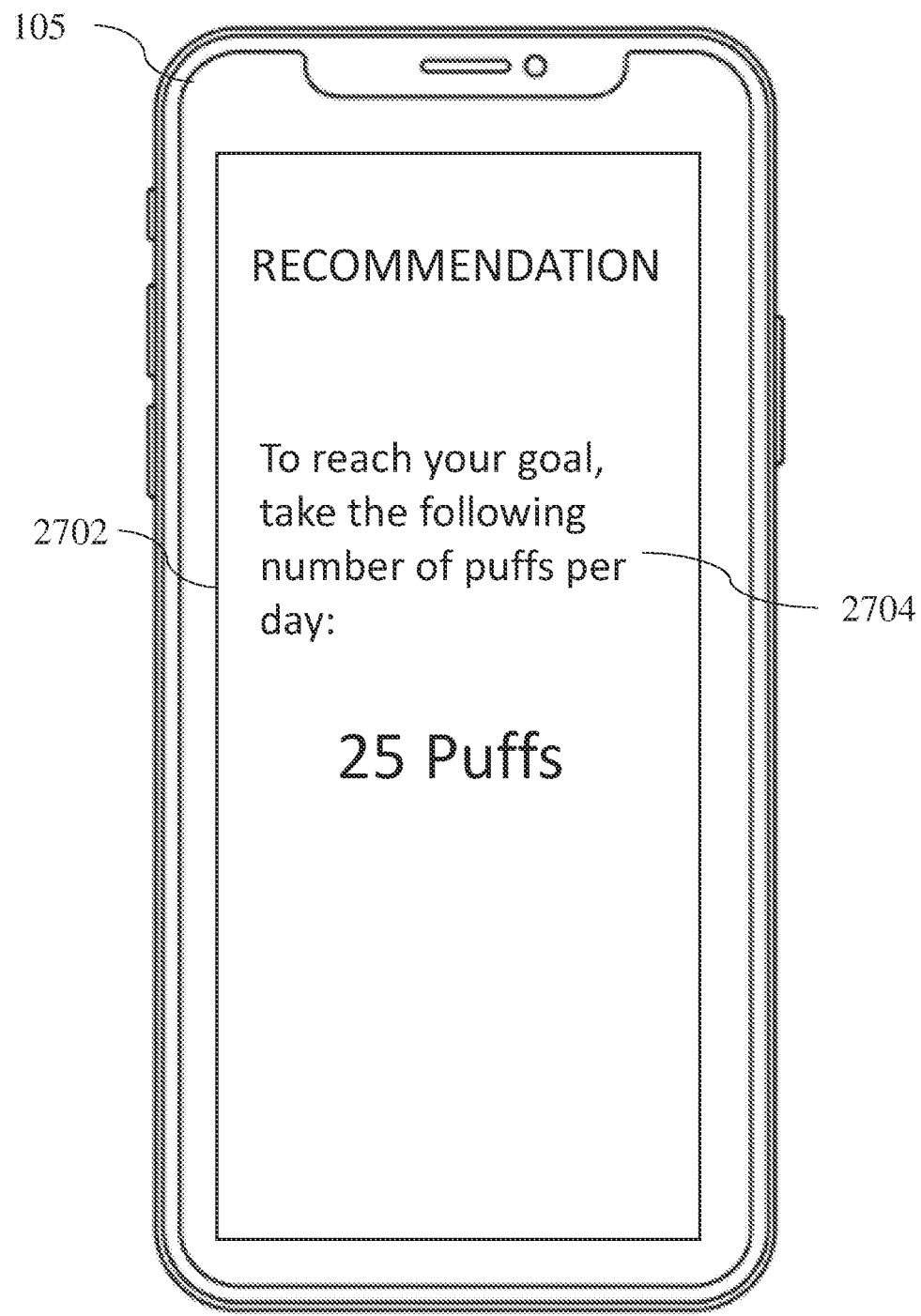
FIG. 27 is a drawing depicting another graphical user interface of the mobile application on the mobile computing device, wherein the graphical user interface is used to manage electronic cigarette usage.

In another embodiment, the mobile application includes a module (such as module 607) configured for providing a text field for a user to enter a goal for electronic cigarette element usage, calculating a comparison of the user's goal for electronic cigarette element usage to the current electronic cigarette element usage and displaying said comparison on the mobile computing device. FIG. 26 shows a graphical user interface 2602 of the mobile application, wherein the graphical user interface is used to manage electronic cigarette usage by displaying calculating a comparison of the user's goal for electronic cigarette element usage 2606 to the current electronic cigarette element usage 2604. Additionally, the mobile application includes a module (such as module 807) configured for calculating a recommendation for meeting the user's goal for electronic cigarette element usage based on the current electronic cigarette element usage and displaying said recommendation on the mobile computing device. Said recommendations may include advice on how many puffs the user may take in a given hour, day, week or month to stay at or below the user's goal for electronic cigarette element usage. FIG. 27 is a drawing depicting another graphical user interface 2702 of the mobile application on the mobile computing device, by displaying a recommendation 2704 for meeting the user's goal for electronic cigarette element usage based on the current electronic cigarette element usage. Therefore, said module is configured to allow a user to manage his usage of the electronic cigarette element, and his vaporizing activity in general.

FIG. 5A further includes a magnetic element. A magnetic element may comprise a magnet 580 that is attracted to a ferrous metal component that is attracted to the mobile phone 105, 700 or 1516. In one embodiment, the housing includes the magnet 580, and the mobile computing device 105, 700 or 1516 may include a ferrous metal component (such as a ferrous metal plate) on its rear surface that is attracted to the magnet, such that the mobile computing device is removably mounted or coupled to the housing. In another embodiment, the location of the magnet and the ferrous metal component is reversed. In yet another embodiment, two magnets are used instead.

Figure 5B:
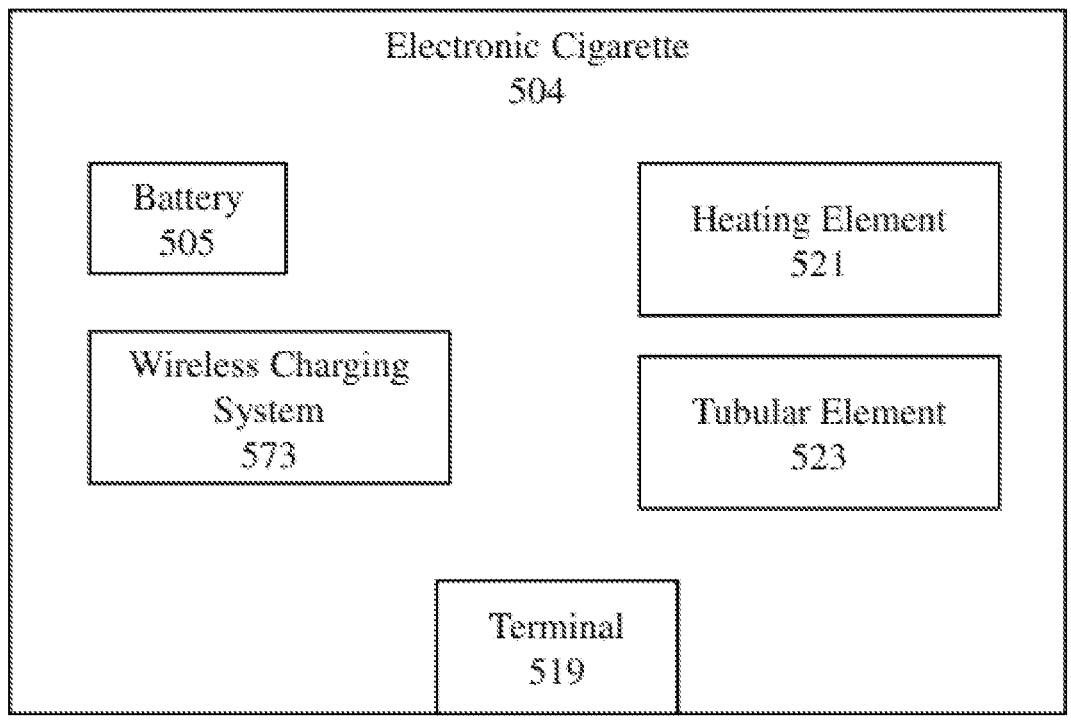
FIG. 5B is a block diagram illustrating components of an electronic cigarette element, according to an example embodiment.

FIG. 5B is a block diagram illustrating components of the electronic cigarette 504, according to an example embodiment, which may comprise all components referred to previously as electronic cigarette element. As explained above, in one alternative, electronic cigarette 504 may include its own removable rechargeable battery 505. In this alternative, the battery 505 is used to power the heating element of the cigarette element, especially when the cigarette element has been removed from the device 100. In one embodiment, the electronic cigarette 504 would include a wireless charging system 573 (well known in the art) that includes an induction coil that interacts with an induction coil associated with an external power source (or wireless charging system 513 on the device 100), so as to execute inductive charging. The heating element 521 of the electronic cigarette may be conductively coupled to the battery 505 such that when the system allows power from the battery to be received by the heating element, the heating element heats the liquid or solid within the electronic cigarette and turns the liquid or solid into a vapor. The tubular element 523 of the electronic cigarette is an elongated hollow element through which the user sucks vapor or smoke while using the electronic cigarette element.

Electronic cigarette 504 may external terminal 519, which is conductively coupled to other components of the cigarette 504, such as rechargeable battery 505. The terminal 519 is the point at which a conductor from cigarette 504 comes to an end and provides a point of connection to external circuits. A terminal may simply be the end of a wire or it may be fitted with a connector or fastener. The terminal may also be a magnetic terminal.

Figures 7, 8:
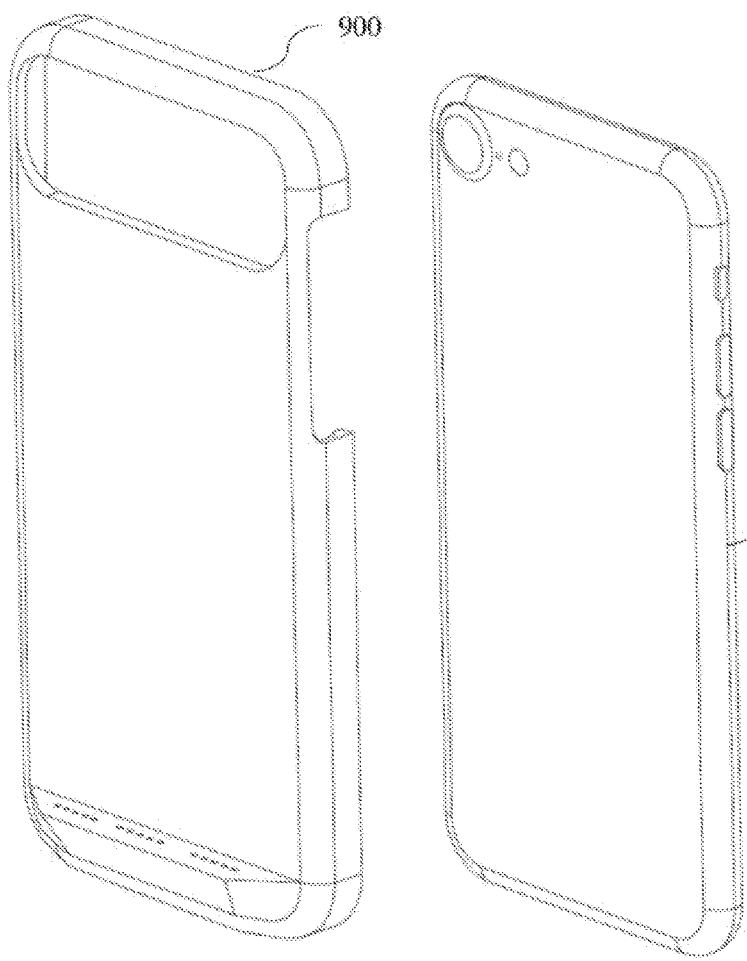
FIG. 7 is an illustration of an embodiment of a mobile phone case, with modular features, according to an example embodiment.
FIG. 8 is an illustration of a conventional mobile phone.

FIG. 7 is an illustration of yet another embodiment of a mobile phone case 900, with modular features, and FIG. 8 is an illustration of a conventional mobile phone. FIG. 7 shows that the mobile phone case 900 is about to be coupled to the mobile phone 700 via a friction fit.

The mobile phone case 900 comprises a protective case element designed for coupling or covering the mobile phone 700. The purpose of the protective case element is to protect the phone from damage due to falls or mishandling of the mobile phone. The protective case element can be sized and designed to fully encase the cellular phone or said case element may be adapted to couple with the phone via a friction fit. The protective case element is designed for coupling to the mobile phone via a friction fit. The protective case element comprises a substantially planar rectangular shaped backing. Along the perimeter of the rectangular shaped backing is a wall element. The wall element has a substantially planar body and is attached along the perimeter of the backing and extends perpendicularly and distally from the surface of the rectangular shaped backing. The wall element has a top end which has a catching feature thereon. The catching feature forms a ridge that extends substantially perpendicularly inboard from the inner surface of the top end of the wall element. The dimension between the catching features on the opposing wall elements is less than the dimension between the opposing wall elements. The material of the protective case is formed from a resilient material, such that forces acting outward may cause the catching features to be pushed outward, and after such forces are removed, the catching features will return back to its original shape.

Such resilient properties of the catching features allow a mobile phone to be inserted into the protective case element and retained by the catching features once in the protective case element. A mobile phone 700 can be received by and held in place in the protective case element via a friction fit. When a mobile or cellular phone is being positioned into the protective case element such that the back of a cellular phone abuts the backing, outward forces act on the resilient material of the inboard facing catching feature. This causes the dimension of the space between catching features on the opposing wall elements to increase to allow the mobile phone to pass into the protective case element. Once the mobile phone 700 is positioned in the protective case element, and outward forces acting on the catching feature of the wall section are removed, this causes the resilient material of the catching features to return to its original position and shape. After the material of the catching feature returns to its original shape, the catching feature facilitates maintaining the cellular phone within the protective case element. The protective case element is sized such that the surfaces of the cell phone fits snug with the inside surfaces of the protective case element when the phone is inside the protective case element. The protective case element may have a plurality of openings or apertures. These openings or apertures are positioned and correspond to the various components of the mobile phone, such as a camera lens, power ports, user controls, etc. and allow proper operation of the phone when inside the protective case element.

In one embodiment, the mobile phone case 900 may include an external terminal 517 (or power port), to which an external power source may be conductively coupled. In another embodiment, the mobile phone case 900 may include an external terminal 515 (or power port) configured for connecting to a power port of a mobile computing device or mobile phone, and the terminal 515 is further configured for routing power to a battery of the mobile computing device, or for routing power from the battery of the mobile computing device.

Figures 9, 10:
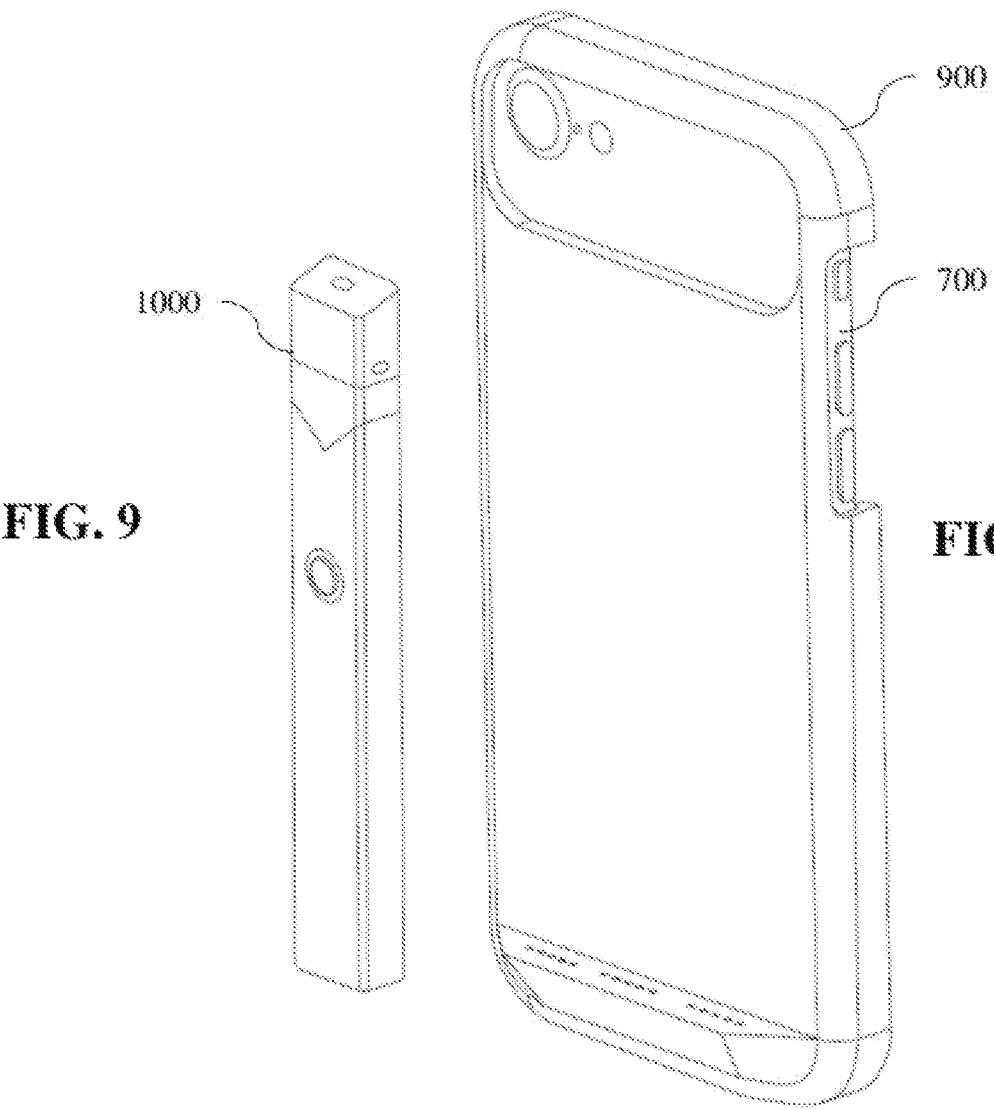
FIG. 9 is an illustration of an electronic cigarette.
FIG. 10 is another illustration of the mobile phone case of FIG. 7, shown in conjunction with the electronic cigarette element.

FIG. 9 is an illustration of an electronic cigarette 1000 and FIG. 10 is another illustration of the mobile phone case of FIG. 7, shown in conjunction with the electronic cigarette element. FIG. 10 shows that the mobile phone case 900 has been coupled to the mobile phone 700 via a friction fit. The mobile phone case 900 may be coupled with an electronic cigarette element 1000 that may be magnetically attached to the mobile phone case 900 via a magnetic element. In FIG. 9, the electronic cigarette element 1000 is an independent and separate element with a longitudinal axis parallel to the longitudinal axis of the mobile phone case 900.

Figure 11:
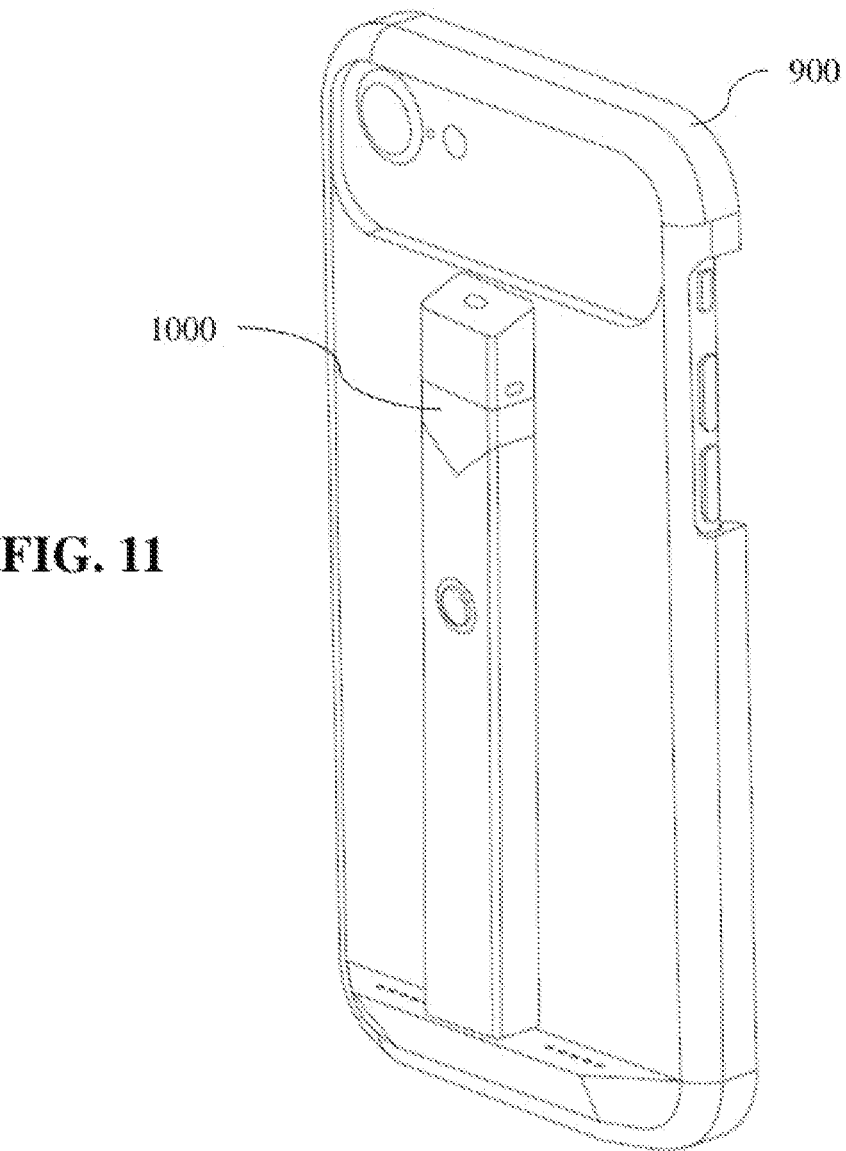
FIG. 11 is another illustration of the mobile phone case of FIG. 7, with an attached electronic cigarette element.

FIG. 11 is another illustration of the mobile phone case of FIG. 7, with an attached electronic cigarette element. FIG. 11 shows that the mobile phone case 900 has been coupled with the electronic cigarette element 1000 via a magnetic element. In FIG. 11, the electronic cigarette element 1000 is removably coupled to the mobile phone case 900 such that the longitudinal axis of the cigarette element is parallel to the longitudinal axis of the mobile phone case 900. In one embodiment, the mobile phone case 900 is removably coupled with the electronic cigarette element 1000 via a magnetic element that allows the cigarette element to be decoupled from the mobile phone case using regular human finger strength or grip strength.

Figure 12:
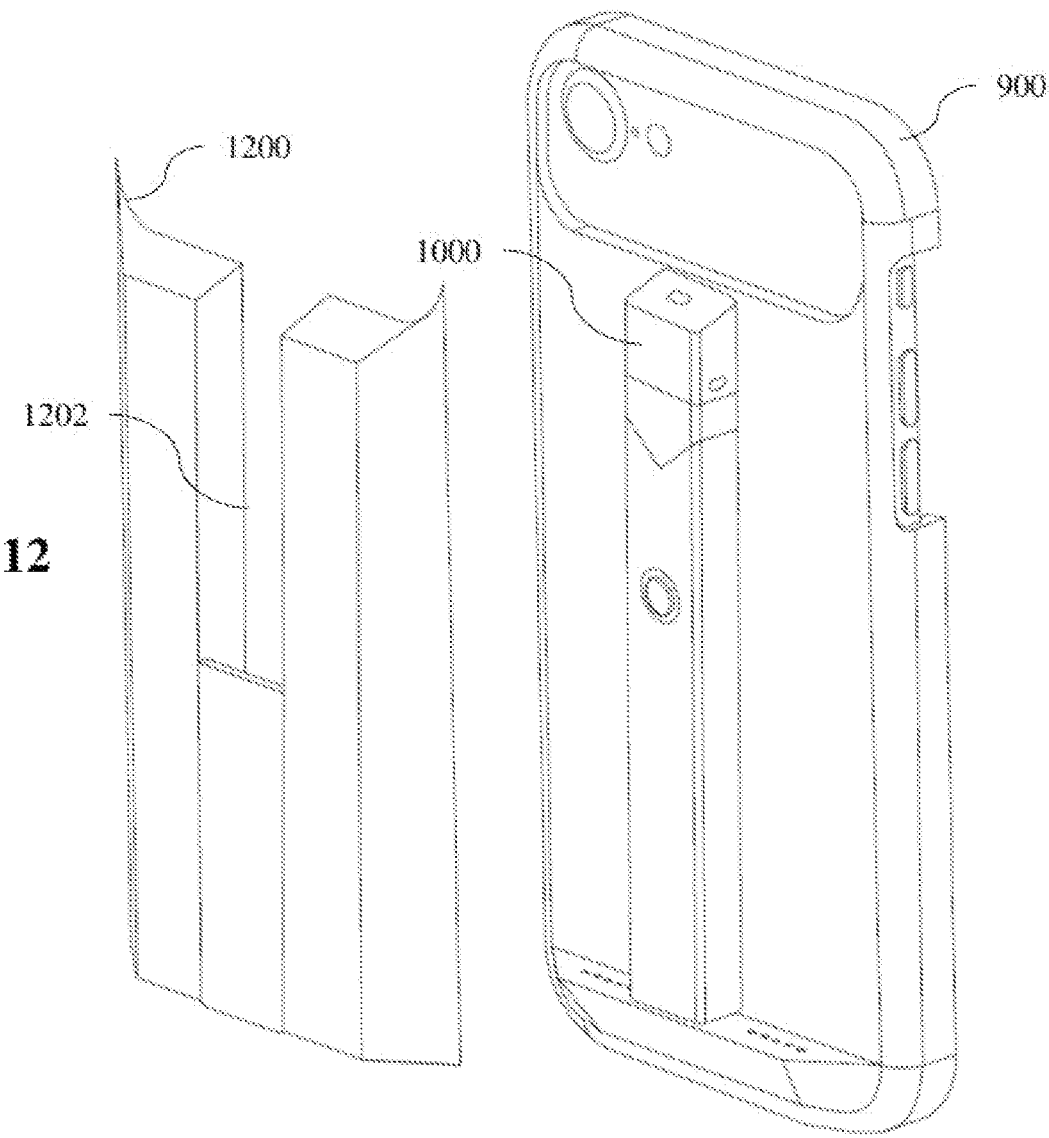
FIG. 12 is another illustration of the mobile phone case of FIG. 7, shown in conjunction with a removable battery pack.

FIG. 12 is another illustration of the mobile phone case of FIG. 7, shown in conjunction with a removable battery pack. FIG. 12 shows that a battery pack 1200 is about to be removably coupled to the mobile phone case 900 via a magnetic element. FIG. 12 also shows a channel or gutter 1202 located in the battery pack 1200, which is shaped and configured to allow for the electronic cigarette element 1000 to be securely inserted into the channel or gutter 1202.

In one embodiment, the battery pack 1200 may include an external terminal 517 (or power port), to which an external power source may be conductively coupled, so as to recharge the batter pack. In another embodiment, the battery pack 1200 may include an external terminal 515 (or power port) configured for connecting to a power port of the mobile phone 700, and the terminal 515 is further configured for routing power from the battery pack 1200 to a battery of the mobile phone 700, or for routing power from the battery of the mobile phone to the battery pack 1200.

Figure 13:
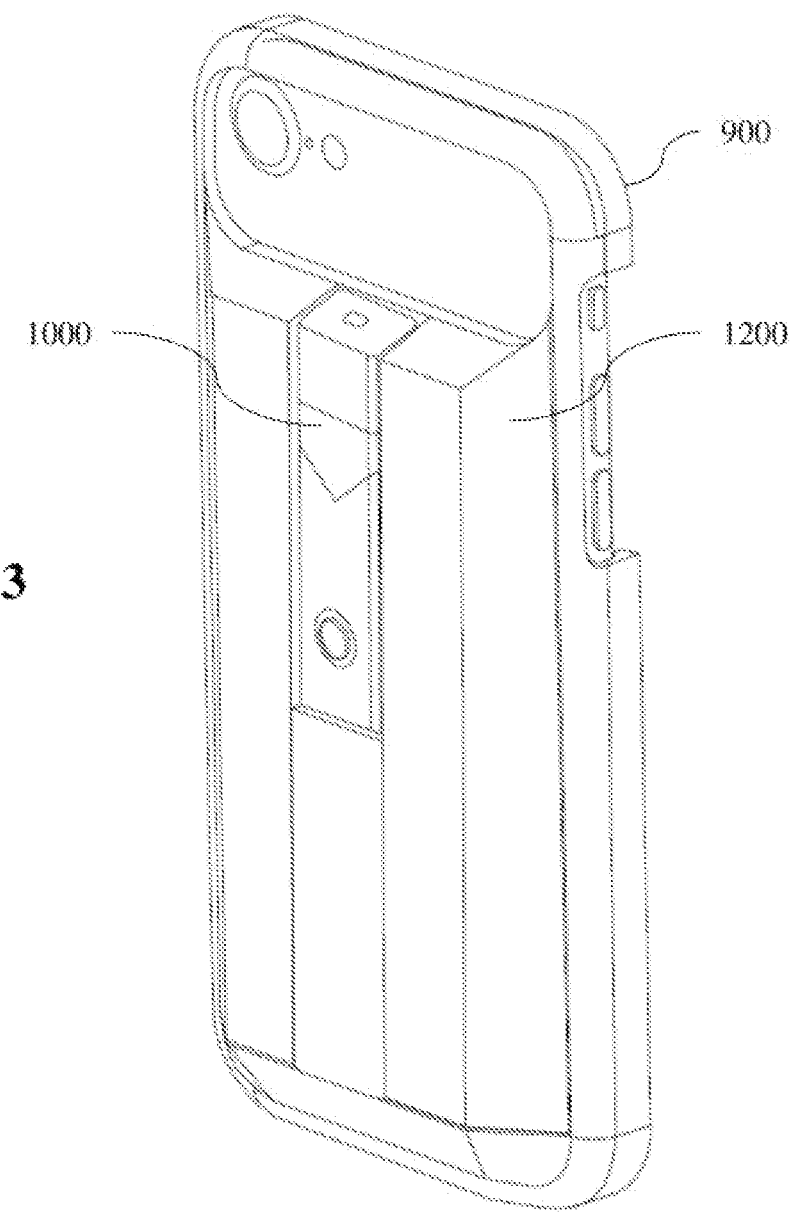
FIG. 13 is another illustration of the mobile phone case of FIG. 7, shown with an attached battery pack.

FIG. 13 is another illustration of the mobile phone case of FIG. 7, shown with an attached battery pack. FIG. 13 shows that the battery pack 1200 has been coupled to the mobile phone case 900 via a magnetic element. In FIG. 13, the battery pack 1200 is an independent and separate element with a longitudinal axis parallel to the longitudinal axis of the mobile phone case 900. Note in FIG. 13 that the electronic cigarette element 1000 has been securely inserted into the channel or gutter 1202. The battery pack 1200 may provide battery power to the cigarette element 1000 via a terminal connection or wirelessly through a wireless charging system. The battery pack 1200 may also provide battery power to the mobile phone 700 via a terminal connection or wirelessly through a wireless charging system. In one embodiment, the battery pack 1200 is not removable but is rather an integrated, non-removable portion of the mobile phone case 900.

Figure 14:
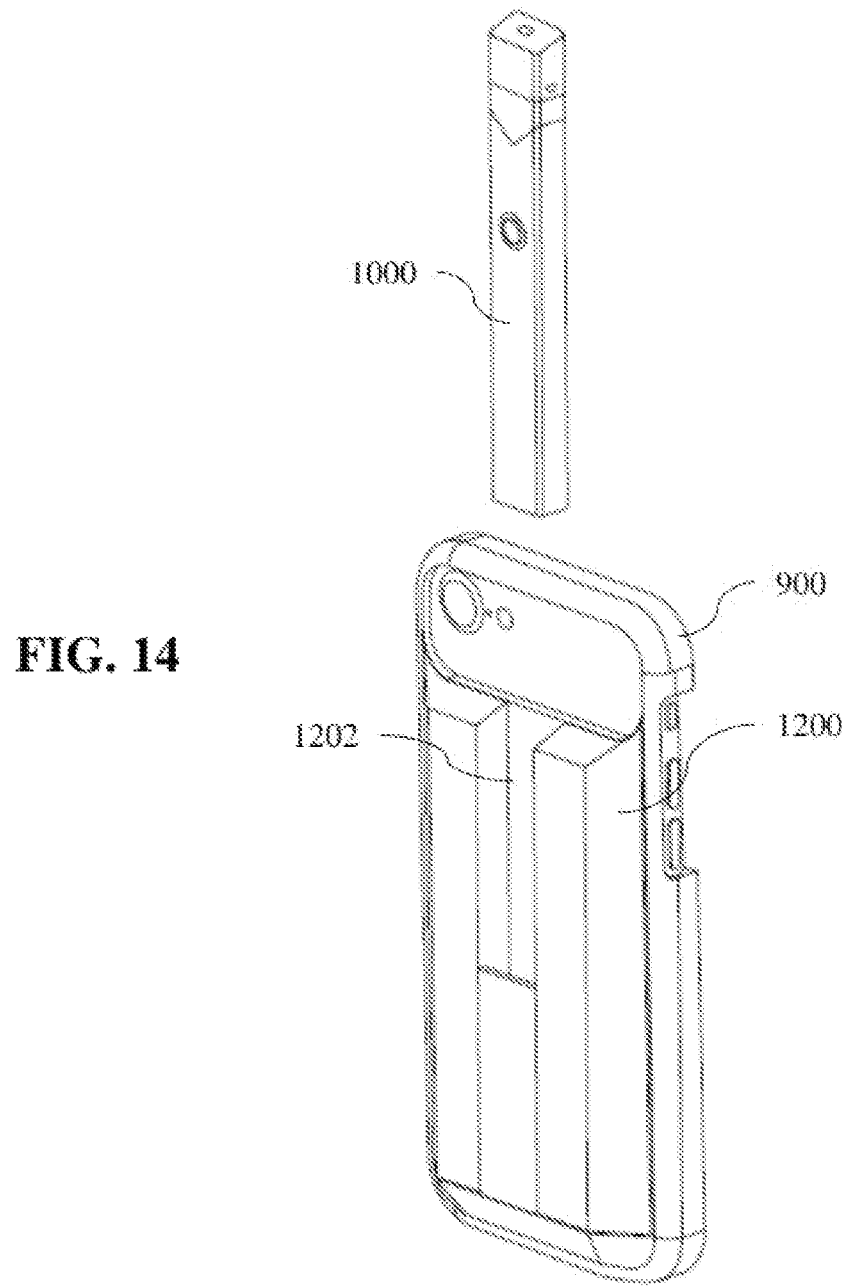
FIG. 14 is another illustration of the mobile phone case of FIG. 7, also shown with an attached battery pack.

FIG. 14 is another illustration of the mobile phone case of FIG. 9, also shown with an attached battery pack. FIG. 14 shows that the battery pack 1200 has been coupled to the mobile phone case 900 and that the electronic cigarette element 1000 has been entirely removed from the channel or gutter 1202 in the battery pack 1200. This arrangement allows the user to more easily utilize the electronic cigarette element 1000 for inhaling vapor. In one embodiment, the battery pack 1200 is not removable but is rather an integrated, non-removable portion of the mobile phone case 900, which includes components of the device 100 for holding and charging an electronic cigarette element. The components within hashed line 502 are the components included in the device 100.

Figure 15:
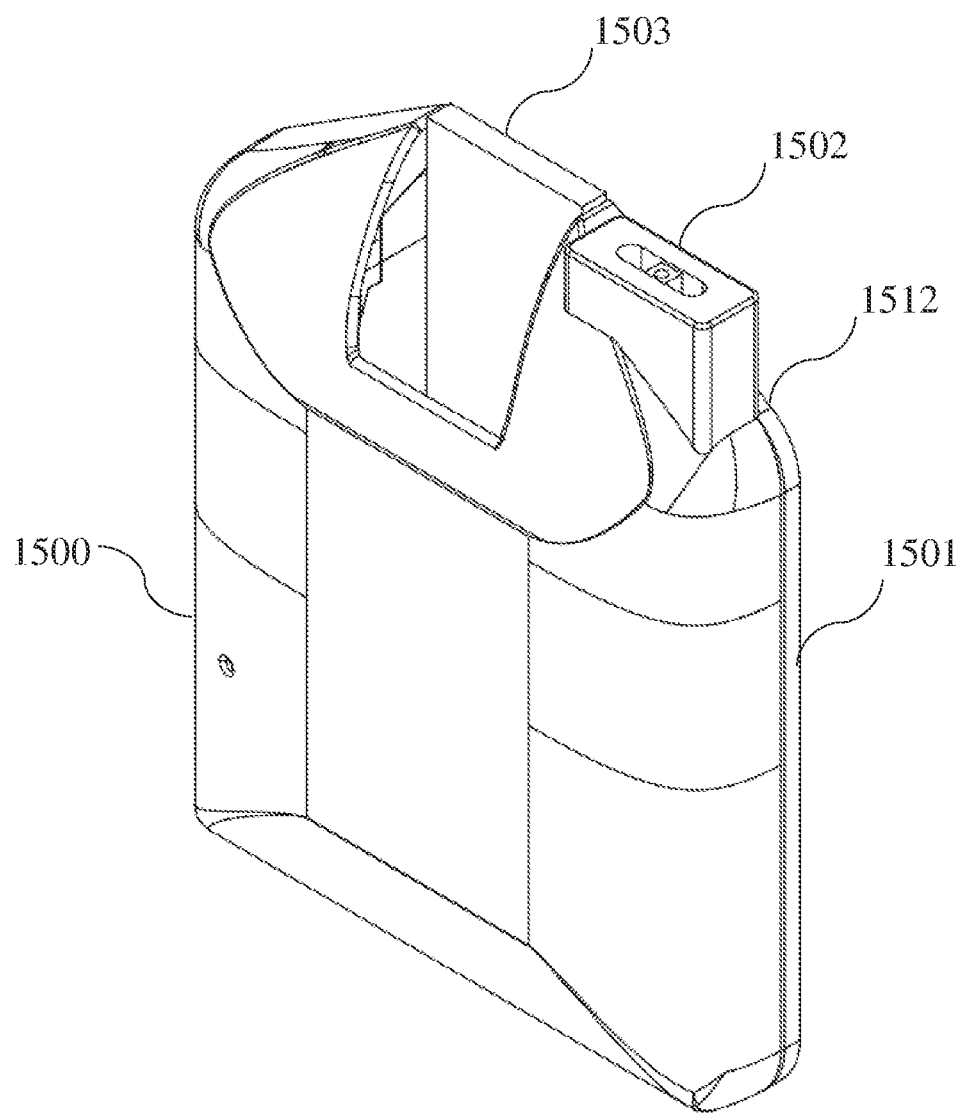
FIG. 15 is a perspective view of a device for holding and charging an electronic cigarette element, according to a different embodiment.

FIG. 15 is a perspective view of a device 1500 for holding and charging an electronic cigarette element, according to a different embodiment. The device 1500 may have the same features and components as the device 100, as shown and described above. The device 1500 is shown to additionally include a housing (an exterior case or enclosure used to protect the interior components of the device 1500) and a receptacle 1503 in the top surface of the housing, the receptacle being configured (i.e., shaped and sized) to accept and securely hold an electronic cigarette element. The device 1500 is further shown to additionally include a receptacle 1512 in the top surface of the housing, the receptacle being configured (i.e., shaped and sized) to accept and securely hold a disposable cartridge 1502 for an electronic cigarette element. The device 1500 is further shown to additionally include a flat rear surface 1501 on the external surface of the housing.

Figure 16:
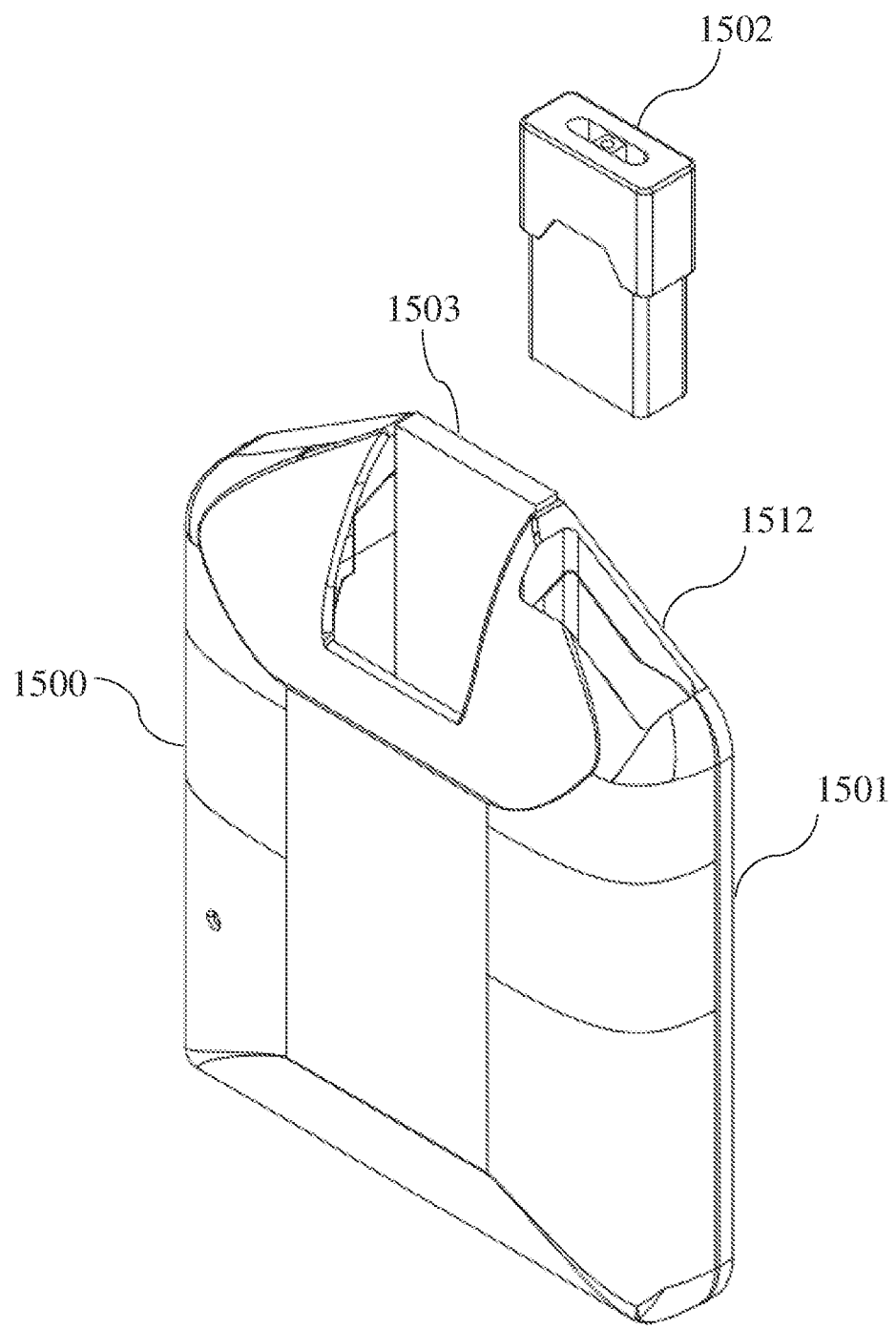
FIG. 16 is a perspective view of the device of FIG. 15, also showing an electronic cigarette cartridge.

FIG. 16 is a perspective view of the device 1500 of FIG. 15, also showing an electronic cigarette cartridge 1502. FIG. 16 shows that the electronic cigarette cartridge 1502 has been removed from the receptacle 1512 in the top surface of the housing.

Figure 17:
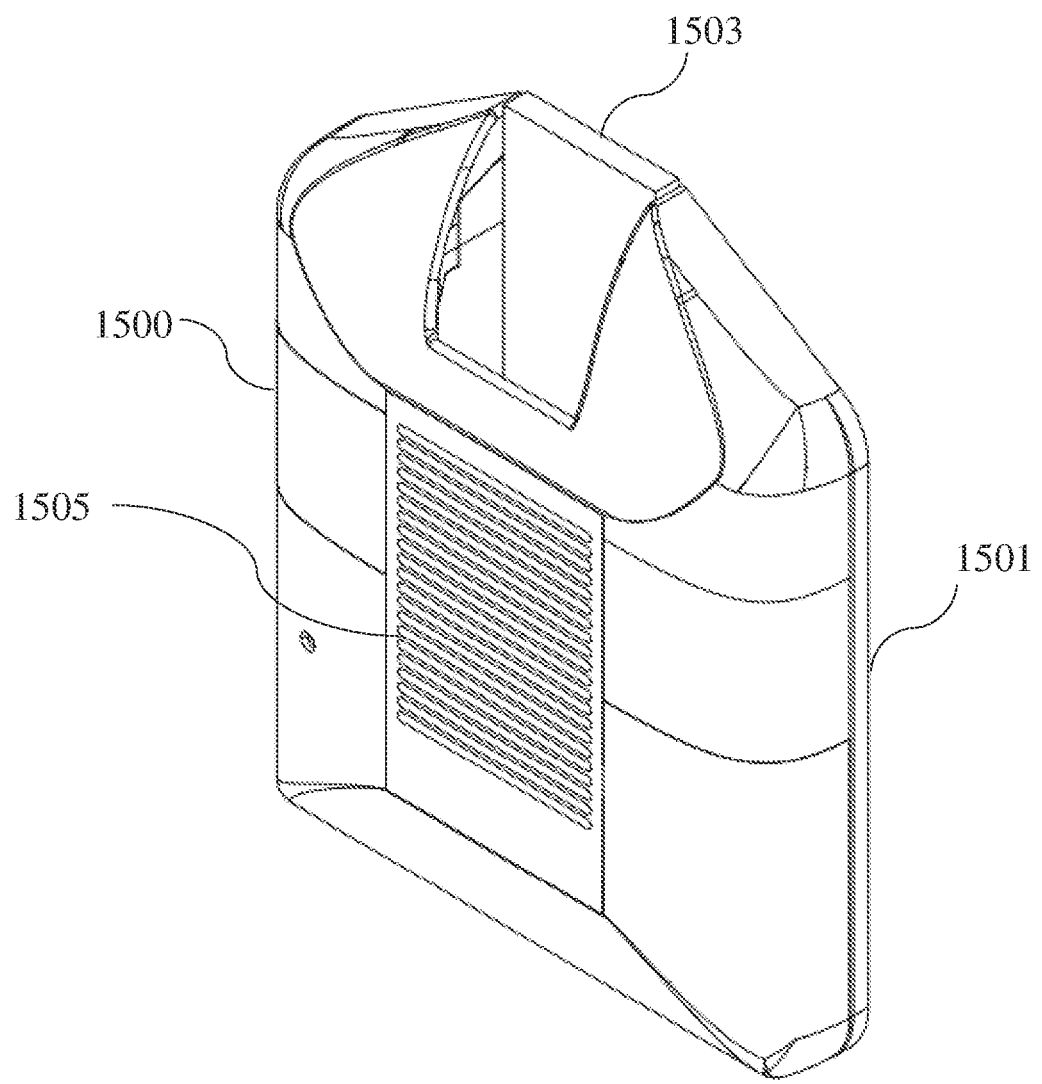
FIG. 17 is a perspective view of the device of FIG. 15, also showing a solar panel.

FIG. 17 is a perspective view of the device 1500 of FIG. 15, also showing a solar panel 1505. A solar panel is a photo-voltaic (PV) module, which is an assembly of photo-voltaic cells mounted in a framework that uses light (usually sunlight) as a source of energy and generates direct current electricity for electrical equipment, or, in this case, device 1500. Device 1500 must also include a charging system that accepts the current from the solar panel 1505, optionally processes the current, and provides said current for recharging of the rechargeable battery.

Figure 18:
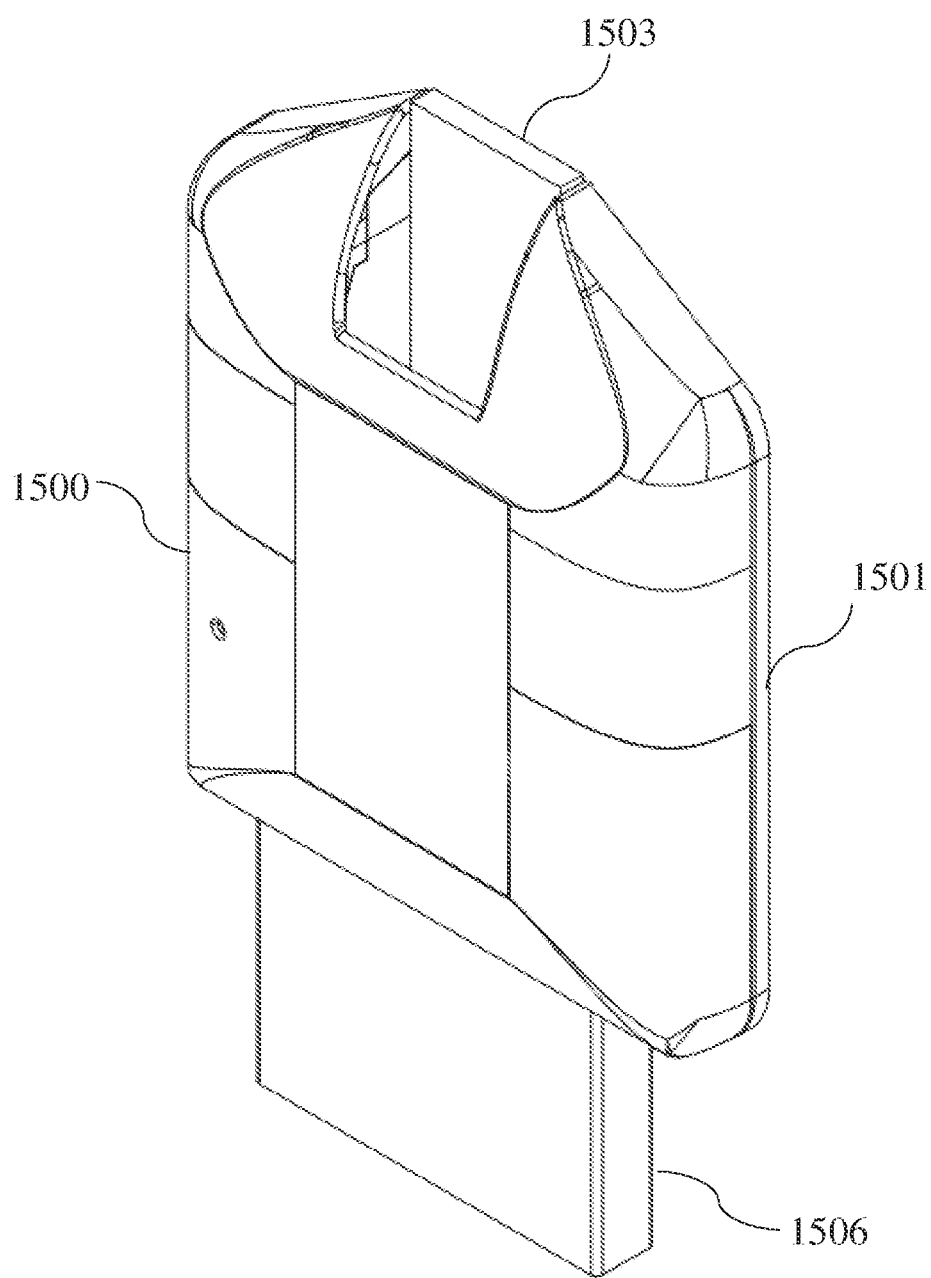
FIG. 18 is a perspective view of the device of FIG. 15, also showing a removable rechargeable battery.

FIG. 18 is a perspective view of the device 1500 of FIG. 15, also showing a removable rechargeable battery 1506, which may be any commercially available rechargeable battery, which is configured (i.e., shaped and sized) to fit securely in a receptacle in the housing of the device 1500. Removable rechargeable battery 1506 may be removed from the receptacle in the device 1500 for recharging, or for replacement with a new working battery.

Figure 19:
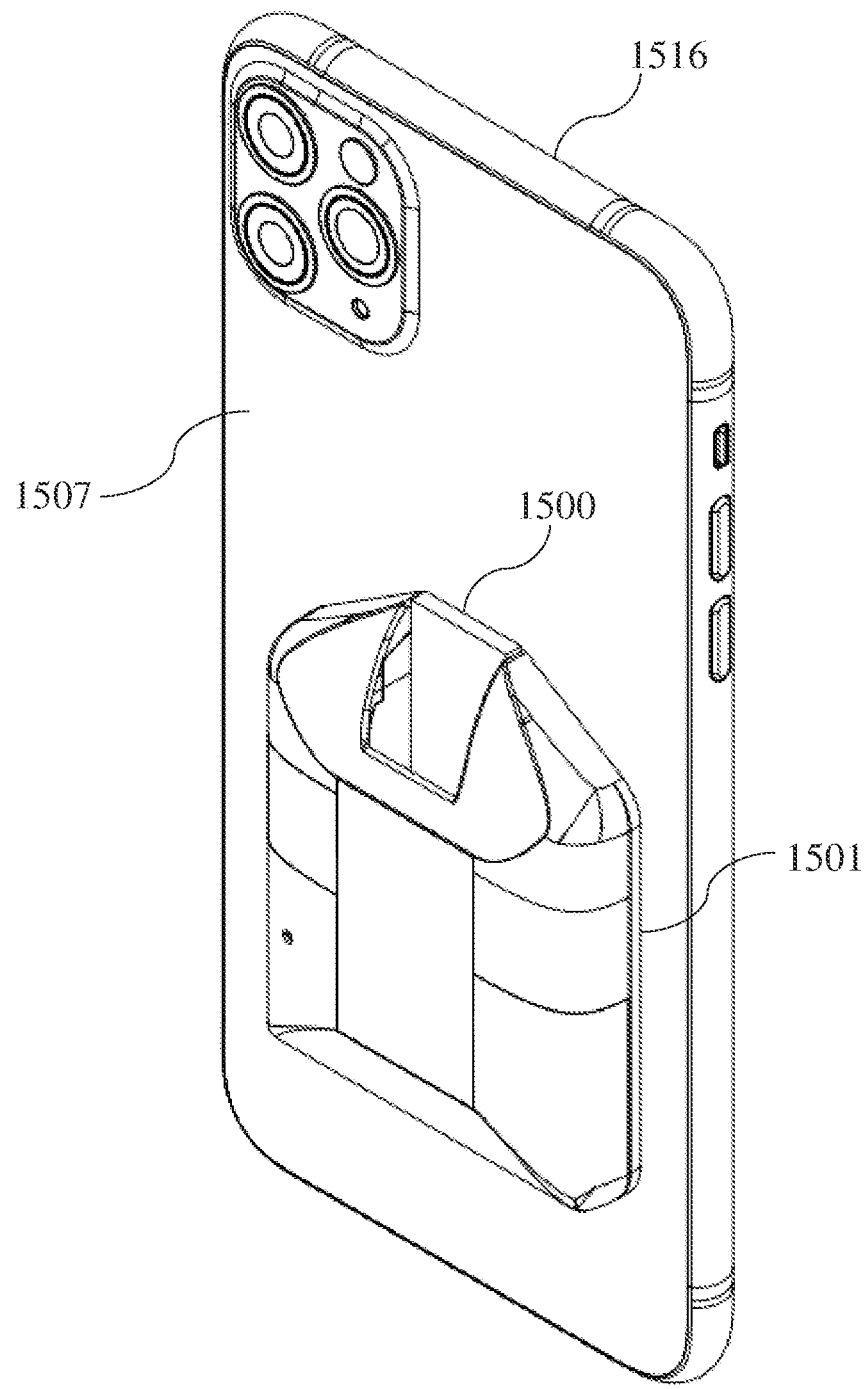
FIG. 19 is a perspective view of the device of FIG. 15, also showing the device attached to a mobile phone.

FIG. 19 is a perspective view of the device 1500 of FIG. 15, also showing the device attached to a mobile phone 1516. FIG. 19 shows that the rear surface 1501 of the device 1500 has been attached to the rear surface 1507 of the phone 1516, using a magnet, an adhesive, or other fastener.

Figure 20:
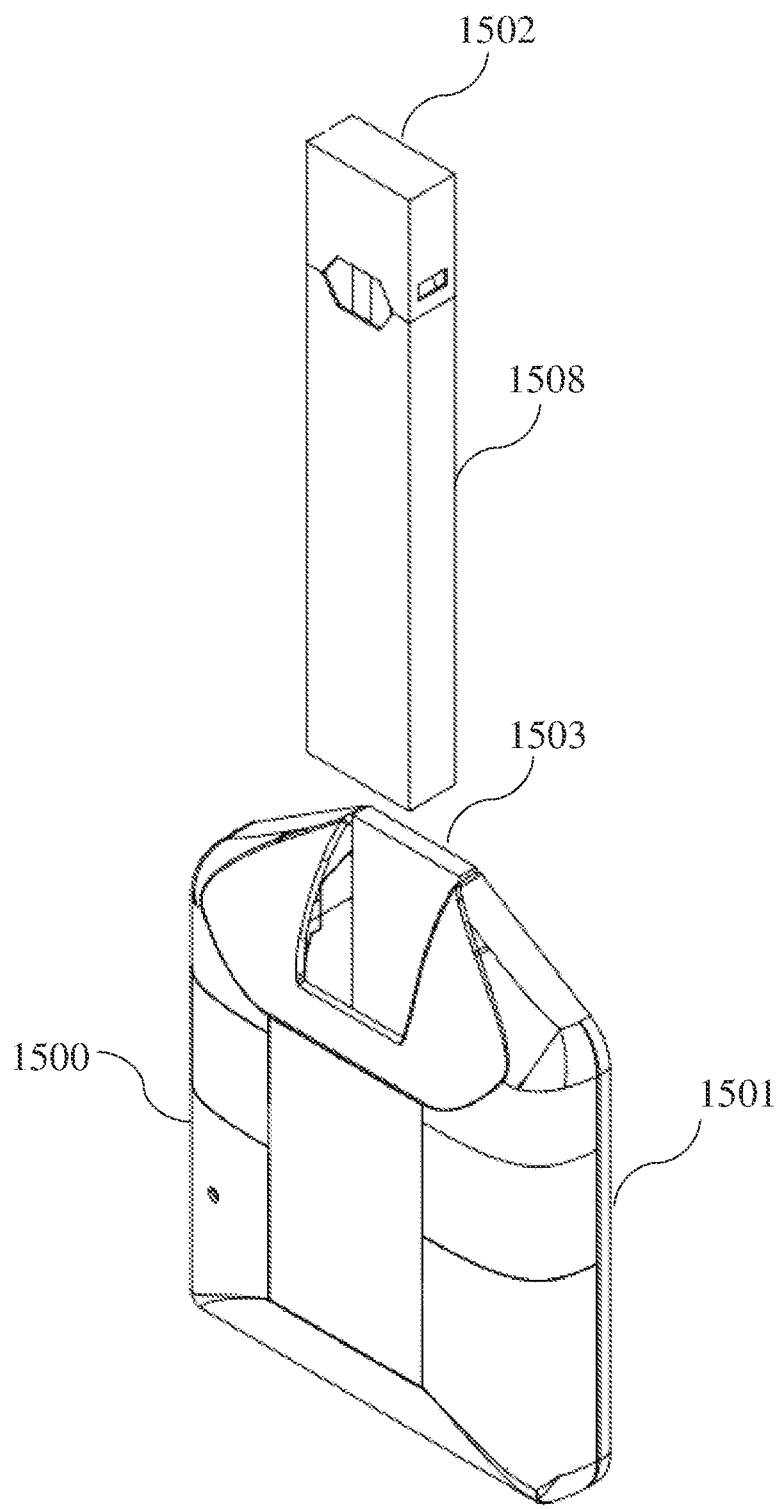
FIG. 20 is a perspective view of the device of FIG. 15, also showing a removable electronic cigarette element.

FIG. 20 is a perspective view of the device of 1500 FIG. 15, also showing a removable electronic cigarette element 1508 with the cartridge 1502 attached thereto. FIG. 20 shows that the receptacle 1503 in the top surface of the housing is configured (i.e., shaped and sized) to accept and securely hold the electronic cigarette element 1508. The electronic cigarette element 1508 may have the same features and components as the device 1000, as shown and described above.

Figure 21:
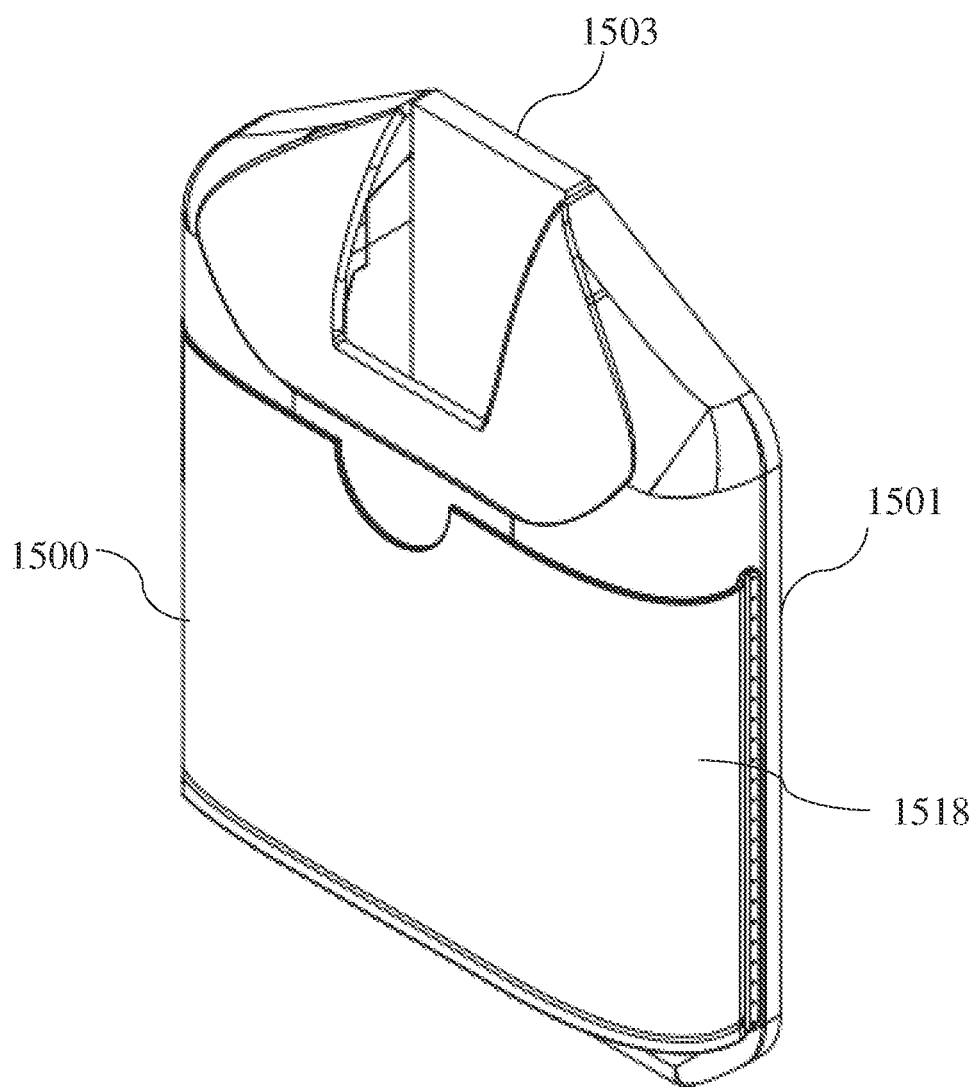
FIG. 21 is a perspective view of the device of FIG. 15, also showing a credit card holder.

FIG. 21 is a perspective view of the device 1500 of FIG. 15, also showing a credit card holder 1518. The holder 1516 may include a fabric, rubber sheath or other material that is extended form the left side of the device 1500 to the right side of the device. There is a divot in the holder 1516 at the top of the element. A credit card, license, identification, or other flat element can fit securely between the holder 1516 and the device 1500.

Figure 22:
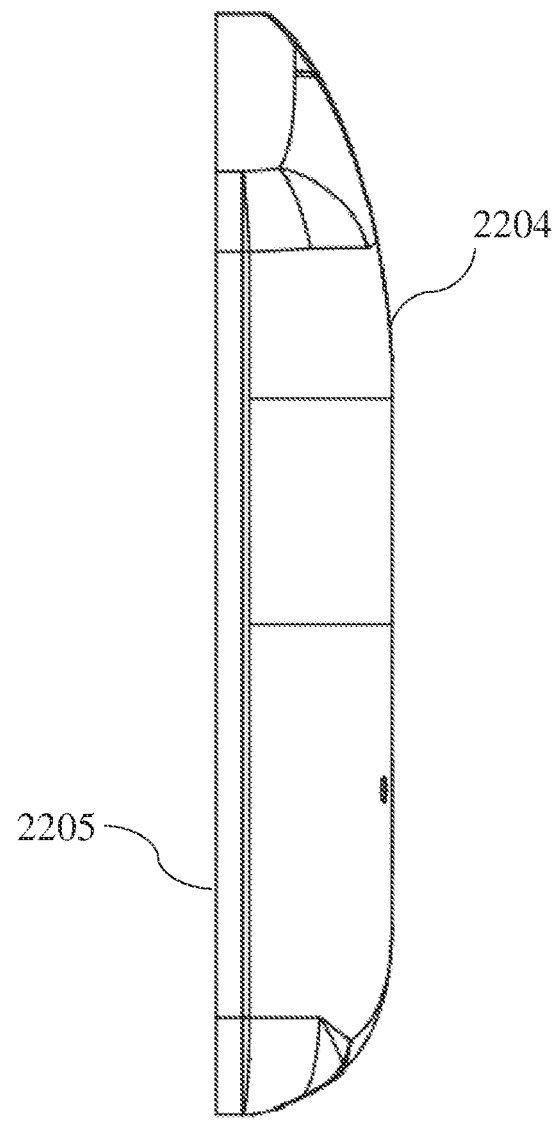
FIG. 22 is a side view of a device with an attached electronic cigarette element, according to a different embodiment.

FIG. 22 is a side view of a device 2204 with an attached electronic cigarette element, according to a different embodiment. The device 2204 is further shown to additionally include a flat rear surface 2205 for attaching to the rear surface 1507 of the phone 1516, using a magnet, an adhesive, or other fastener. The device 2204 may have the same features and components as the devices 100, 1500, as shown and described above.

Figure 23:
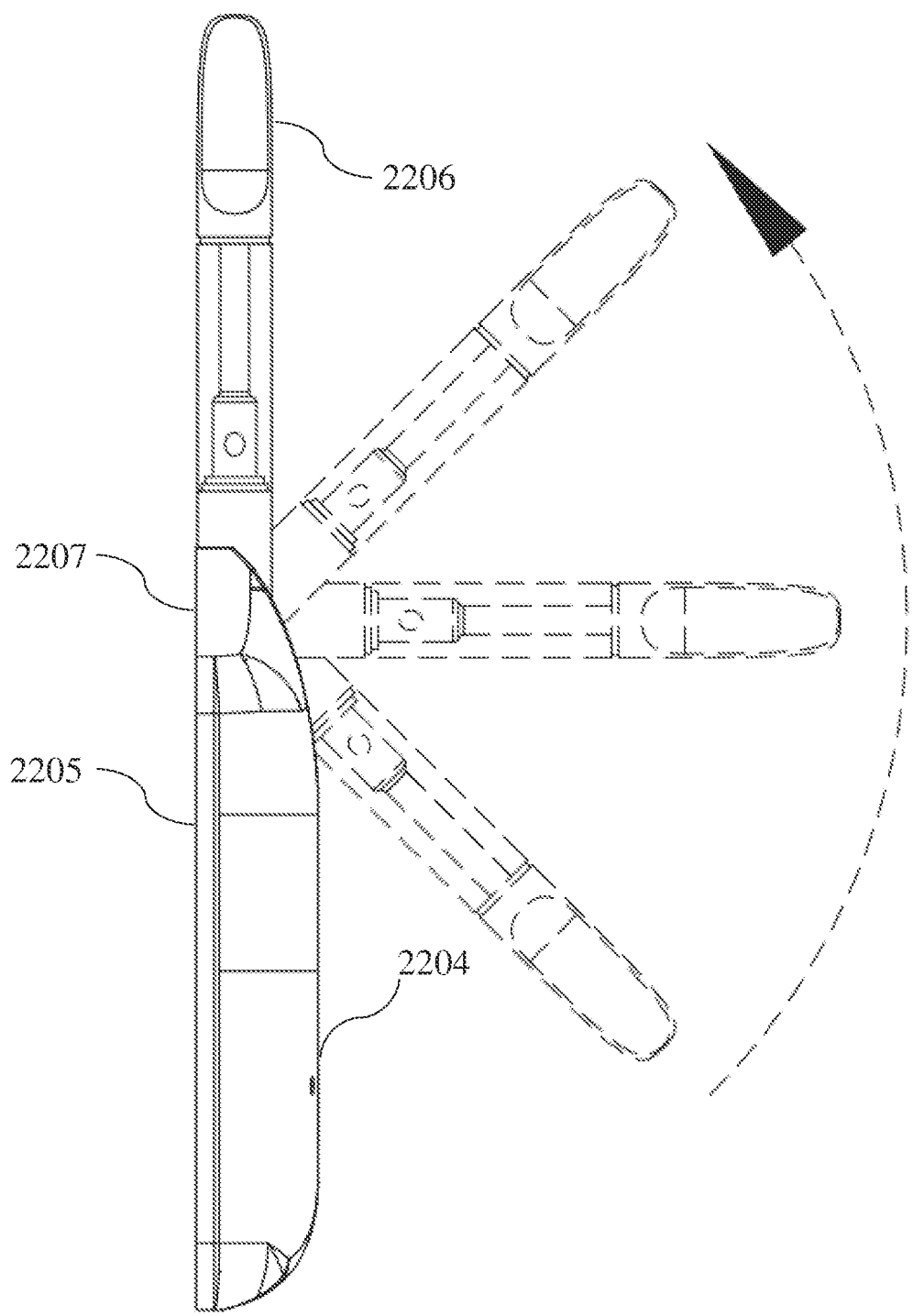
FIG. 23 is a side view of the device of FIG. 22, also showing an attached electronic cigarette element rotating out of the device.

FIG. 23 is a side view of the device of FIG. 22, also showing an attached electronic cigarette element 2206 rotating out of the device via a rotatable hinge 2207. The electronic cigarette element 2206 may have the same features and components as the device 1000, 1508, as shown and described above.

Figure 24:
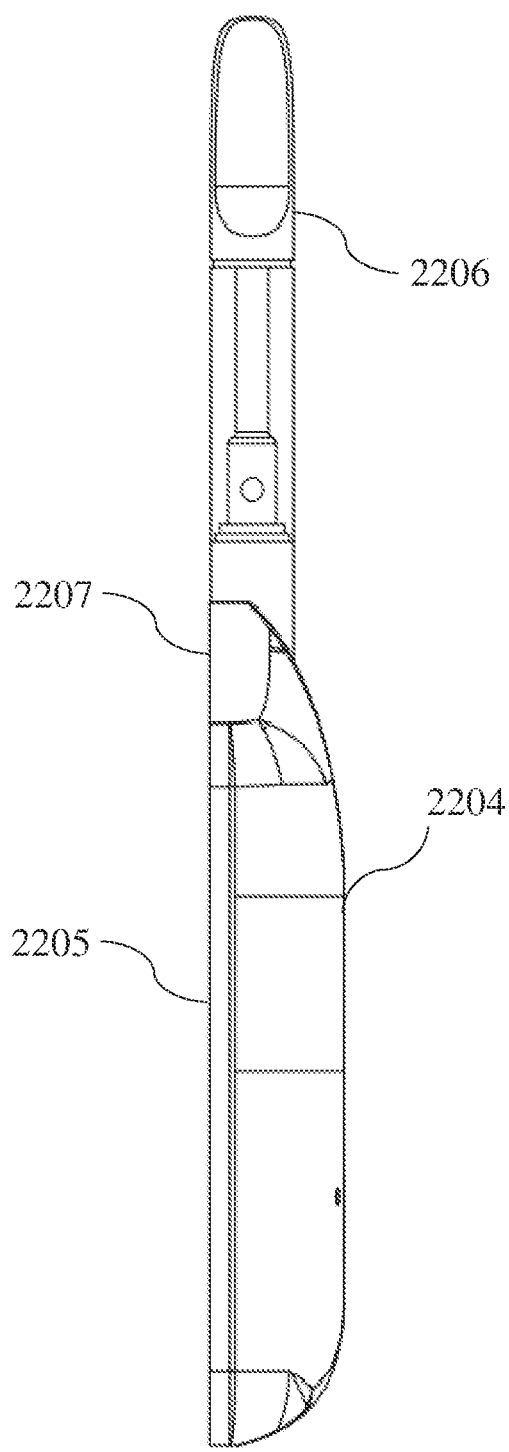
FIG. 24 is a side view of the device of FIG. 22, showing the attached electronic cigarette element in a fully deployed position.
Figure 25:
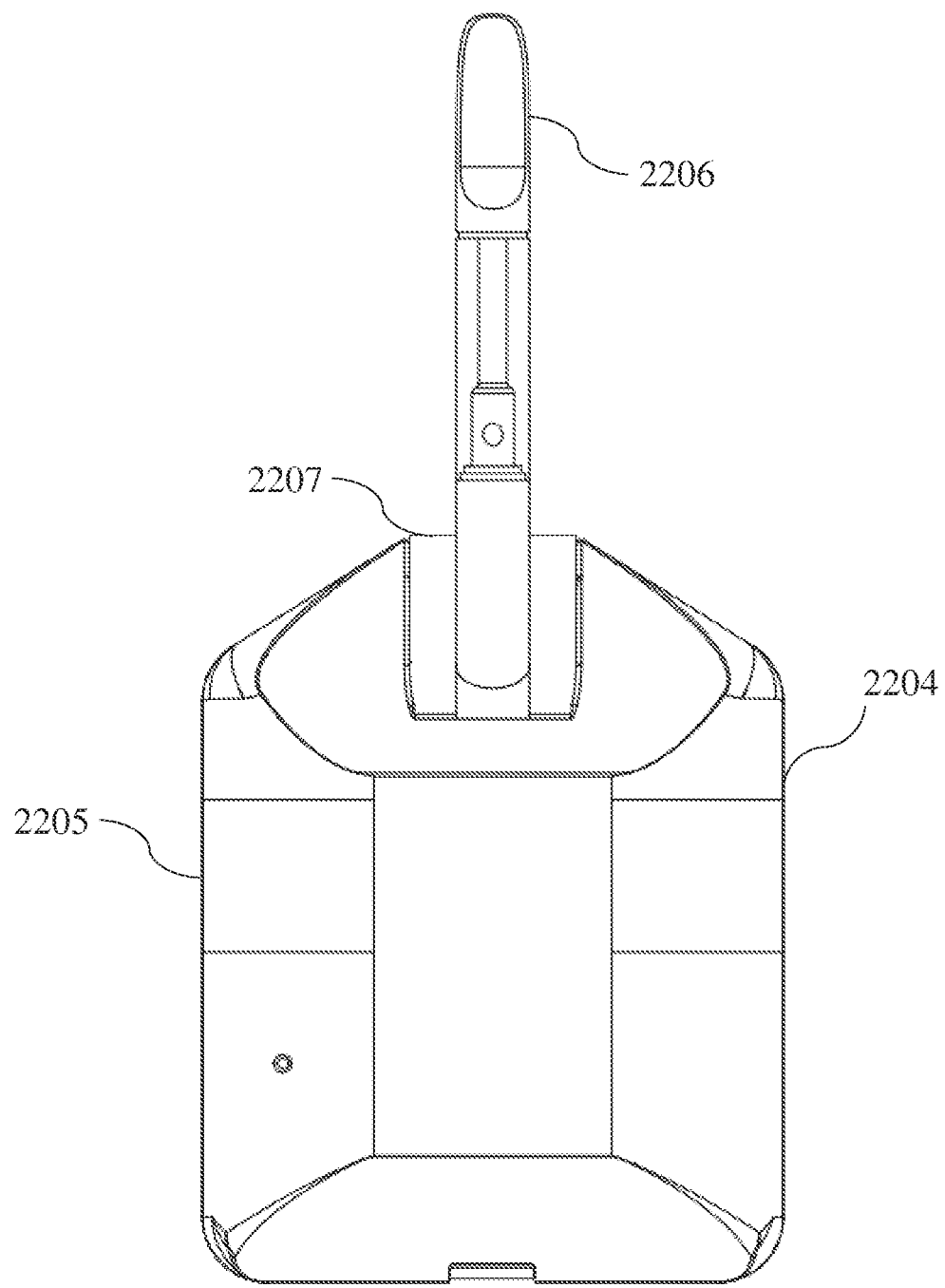
FIG. 25 is a front view of the device of FIG. 22, showing the attached electronic cigarette element in a fully deployed position.

FIG. 24 is a side view of the device of FIG. 22, showing the attached electronic cigarette element 2206 in a fully deployed position. The electronic cigarette element 2206 may include a sensor that detects when the attached electronic cigarette element 2206 is in a fully deployed position. When said position is sensed, the device 2204 may enable the electronic cigarette element 2206 for use (i.e., smoking or vaping) by the user. The electronic cigarette element 2206 may further include a sensor that detects when the attached electronic cigarette element 2206 is not in a fully deployed position. When said position is sensed, the device 2204 may disable the electronic cigarette element 2206 for use (i.e., smoking or vaping) by the user. FIG. 25 is a front view of the device of FIG. 22, showing the attached electronic cigarette element 2206 in a fully deployed position.

Figure 6:
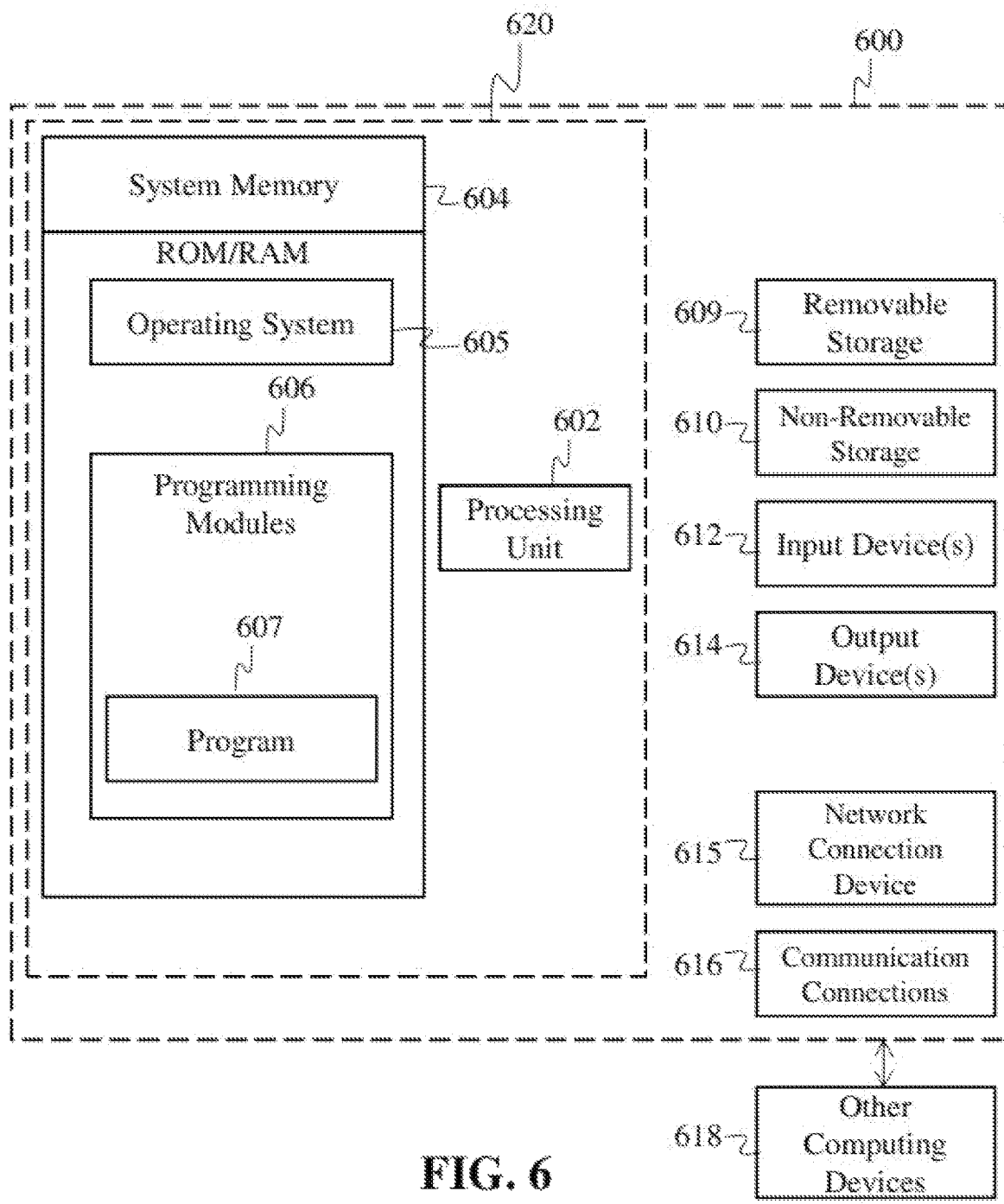
FIG. 6 is a block diagram of a computing device, according to an example embodiment.

FIG. 6 is a block diagram of a system including an example computing device or computer/processors 600. Consistent with the embodiments described herein, the aforementioned actions performed by computer/processor 550 and mobile computing devices 700, 1516 may be implemented in a computing device, such as the computing device 600 of FIG. 6. Any suitable combination of hardware, software, or firmware may be used to implement the computing device 600. The aforementioned system, device, and processors are examples and other systems, devices, and processors may comprise the aforementioned computing device. Furthermore, computing device 600 may comprise an operating environment for performing the processing functions described as described above. Additionally, the computer/processor 550 and mobile computing devices 700, 1516 may operate in other systems and are not limited to computing device 600.

With reference to FIG. 6, a system consistent with an embodiment herein may include a plurality of computing devices, such as computing device 600. In a basic configuration, computing device 600 may include at least one processing unit 602 and a system memory 604. Depending on the configuration and type of computing device, system memory 604 may comprise, but is not limited to, volatile (e.g. random access memory (RAM)), non-volatile (e.g. read-only memory (ROM)), flash memory, or any combination or memory. System memory 604 may include operating system 605, and one or more programming modules 606. Operating system 605, for example, may be suitable for controlling computing device 600's operation. In one embodiment, programming modules 606 may include, for example, a program module 607 for executing the actions of computer/processor 550 and mobile computing devices 700, 1516, for example. Furthermore, embodiments herein may be practiced in conjunction with a graphics library, other operating systems, or any other application program and is not limited to any particular application or system. This basic configuration is illustrated in FIG. 6 by those components within a dashed line 620.

Computing device 600 may have additional features or functionality. For example, computing device 600 may also include additional data storage devices (removable and/or non-removable) such as, for example, magnetic disks, optical disks, or tape. Such additional storage is illustrated in FIG. 6 by a removable storage 609 and a non-removable storage 610. Computer storage media may include volatile and nonvolatile, removable, and non-removable media implemented in any method or technology for storage of information, such as computer readable instructions, data structures, program modules, or other data. System memory 604, removable storage 609, and non-removable storage 610 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 600. Any such computer storage media may be part of device 600. Computing device 600 may also have input device(s) 612 such as a keyboard, a mouse, a pen, a sound input device, a camera, a touch input device, etc. Output device(s) 614 such as a display, speakers, a printer, etc. may also be included. The aforementioned devices are only examples, and other devices may be added or substituted.

Computing device 600 may also contain a communication connection 616 that may allow device 600 to communicate with other computing devices 618, such as over a network in a distributed computing environment, for example, an intranet or the Internet. Communication connection 616 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both computer storage media and communication media.

As stated above, a number of program modules and data files may be stored in system memory 604, including operating system 605. While executing on processing unit 602, programming modules 606 (e.g. program module 607) may perform processes including, for example, one or more of the stages of the processes as described above. The aforementioned processes are examples, and processing unit 602 may perform other processes. Other programming modules that may be used in accordance with embodiments herein may include electronic mail and contacts applications, word processing applications, spreadsheet applications, database applications, slide presentation applications, drawing or computer-aided application programs, etc.

Generally, consistent with embodiments herein, program modules may include routines, programs, components, data structures, and other types of structures that may perform particular tasks or that may implement particular abstract data types. Moreover, embodiments herein may be practiced with other computer system configurations, including handheld devices, multiprocessor systems, microprocessor-based or programmable consumer electronics, minicomputers, mainframe computers, and the like. Embodiments herein may also be practiced in distributed computing environments where tasks are performed by remote processing devices that are linked through a communications network. In a distributed computing environment, program modules may be located in both local and remote memory storage devices.

Furthermore, embodiments herein may be practiced in an electrical circuit comprising discrete electronic elements, packaged or integrated electronic chips containing logic gates, a circuit utilizing a microprocessor, or on a single chip (such as a System on Chip) containing electronic elements or microprocessors. Embodiments herein may also be practiced using other technologies capable of performing logical operations such as, for example, AND, OR, and NOT, including but not limited to mechanical, optical, fluidic, and quantum technologies. In addition, embodiments herein may be practiced within a general-purpose computer or in any other circuits or systems.

Embodiments herein, for example, are described above with reference to block diagrams and/or operational illustrations of methods, systems, and computer program products according to embodiments herein. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments herein have been described, other embodiments may exist. Furthermore, although embodiments herein have been described as being associated with data stored in memory and other storage mediums, data can also be stored on or read from other types of computer-readable media, such as secondary storage devices, like hard disks, floppy disks, or a CD-ROM, or other forms of RAM or ROM. Further, the disclosed methods' stages may be modified in any manner, including by reordering stages and/or inserting or deleting stages, without departing from the claimed embodiments.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. An electronic cigarette charging and management system comprising:
   a) a charging device including:
      1) a housing configured for coupling to a rear of a mobile computing device, the housing including a rechargeable battery;
      2) a first power port in the housing, the first power port conductively coupled to the rechargeable battery and configured for accepting external power for recharging the rechargeable battery;
      3) a first receptacle in the housing, wherein the first receptacle is configured to accept an electronic cigarette element;
      4) a charging terminal located in the first receptacle such that when the electronic cigarette element is inserted into the first receptacle, one end of the electronic cigarette element contacts the charging terminal, and wherein the charging terminal is conductively coupled to the rechargeable battery, wherein when the electronic cigarette element contacts the charging terminal, the rechargeable battery recharges a battery of the electronic cigarette element; and
      5) a processor configured for communicably coupling to the electronic cigarette element and collecting data from the electronic cigarette element including battery level, electronic cigarette liquid level and current electronic cigarette element usage; and
   b) a mobile application executing on the mobile computing device, the mobile application configured for communicably coupling the mobile computing device to the charging device, reading the data from the charging device, and displaying said data on the mobile computing device.

2. The system of claim 1, the charging device further comprising a flat surface on a rear of the housing and a magnet on said flat surface for coupling to the rear of the mobile computing device.

3. The system of claim 2, the charging device further comprising a wireless charging system embedded in the housing, wherein when the housing is placed in proximity to the mobile computing device, the wireless charging system charges a battery of the mobile computing device.

4. The system of claim 3, wherein the wireless charging system of the charging device is an inductive charging system.

5. The system of claim 4, wherein the charging terminal of the charging device comprises at least one male protrusion that is inserted into a détente in the electric cigarette element.

6. The system of claim 5, wherein current electronic cigarette element usage comprises a number of puffs of the electronic cigarette element from a set date to the present.

7. The system of claim 5, wherein current electronic cigarette element usage comprises an amount of electronic cigarette liquid consumed from a set date to the present.

8. The system of claim 5, wherein the mobile application further comprises a module configured for providing a text field for a user to enter a goal for electronic cigarette element usage.

9. The system of claim 8, wherein the module is further configured for calculating a comparison of the user's goal for electronic cigarette element usage to the current electronic cigarette element usage and displaying said comparison on the mobile computing device.

10. The system of claim 8, wherein the module is further configured for calculating a recommendation for meeting the user's goal for electronic cigarette element usage based on the current electronic cigarette element usage and displaying said recommendation on the mobile computing device.

11. An electronic cigarette charging and management system comprising:
   a) a charging device including:
      1) a housing configured for coupling to a rear of a mobile computing device, the housing including a removable rechargeable battery located in a first receptacle in the housing;
      2) a first power port in the housing, the first power port conductively coupled to the rechargeable battery and configured for accepting external power for recharging the rechargeable battery;
      3) a second receptacle in the housing, wherein the second receptacle is configured to accept an electronic cigarette element;
      4) a charging terminal located in the second receptacle such that when the electronic cigarette element is inserted into the second receptacle, one end of the electronic cigarette element contacts the charging terminal, and wherein the charging terminal is conductively coupled to the rechargeable battery, wherein when the electronic cigarette element contacts the charging terminal, the rechargeable battery recharges a battery of the electronic cigarette element; and 5) a processor configured for communicably coupling to the electronic cigarette element and collecting data from the electronic cigarette element including battery level, oil, tobacco, flower or bud level and current electronic cigarette element usage; and b) a mobile application executing on the mobile computing device, the mobile application configured for communicably coupling the mobile computing device to the charging device, reading the data from the charging device, and displaying said data on the mobile computing device.

12. The system of claim 11, the charging device further comprising a flat surface on a rear of the housing and a magnet on said flat surface for coupling to the rear of the mobile computing device.

13. The system of claim 12, the charging device further comprising a wireless charging system embedded in the housing, wherein when the housing is placed in proximity to the mobile computing device, the wireless charging system charges a battery of the mobile computing device.

14. The system of claim 13, wherein the wireless charging system of the charging device is an inductive charging system.

15. The system of claim 14, wherein the charging terminal of the charging device comprises at least one male protrusion that is inserted into a détente in the electric cigarette element.

16. The system of claim 15, wherein current electronic cigarette element usage comprises a number of puffs of the electronic cigarette element from a set date to the present.

17. The system of claim 15, wherein current electronic cigarette element usage comprises an amount of tobacco, flower, bud, or oil consumed from a set date to the present.

18. The system of claim 15, wherein the mobile application further comprises a module configured for providing a text field for a user to enter a goal for electronic cigarette element usage.

19. The system of claim 18, wherein the module is further configured for calculating a comparison of the user's goal for electronic cigarette element usage to the current electronic cigarette element usage and displaying said comparison on the mobile computing device.

20. The system of claim 18, wherein the module is further configured for calculating a recommendation for meeting the user's goal for electronic cigarette element usage based on the current electronic cigarette element usage and displaying said recommendation on the mobile computing device.

* * * * *